(12) United States Patent
Mukherjee

(10) Patent No.: US 12,470,267 B2
(45) Date of Patent: Nov. 11, 2025

(54) APPARATUS AND METHODS FOR UPLINK MIMO ENHANCEMENT IN WIRELESS SYSTEMS

(71) Applicant: Charter Communications Operating, LLC, St. Louis, MO (US)

(72) Inventor: Amitav Mukherjee, Elk Grove, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/397,616

(22) Filed: Aug. 9, 2021

(65) Prior Publication Data

US 2021/0391900 A1 Dec. 16, 2021

Related U.S. Application Data

(63) Continuation of application No. 15/931,290, filed on May 13, 2020, now Pat. No. 11,088,741.

(51) Int. Cl.
*H04B 7/0456* (2017.01)

(52) U.S. Cl.
CPC ................ *H04B 7/0473* (2013.01)

(58) Field of Classification Search
CPC .. H04B 7/0473; H04B 7/0486; H04B 7/0478; H04B 7/0007; H04L 27/2601; H04L 5/0007

See application file for complete search history.

(56) References Cited

U.S. PATENT DOCUMENTS

| | | | |
|---|---|---|---|
| 10,523,358 B1 * | 12/2019 | Park | H04B 7/0686 |
| 2012/0027004 A1 * | 2/2012 | Ko | H04B 7/0678 370/344 |
| 2017/0171740 A1 * | 6/2017 | Wu | H04B 7/0693 |
| 2018/0183503 A1 | 6/2018 | Rahman et al. | |
| 2018/0324715 A1 * | 11/2018 | Ryoo | H04L 5/0053 |
| 2019/0109679 A1 * | 4/2019 | Liu | H04B 7/0456 |
| 2019/0222399 A1 * | 7/2019 | Huang | H04L 5/26 |
| 2019/0253300 A1 | 8/2019 | Munier et al. | |
| 2019/0385380 A1 * | 12/2019 | Yoon | G06T 19/006 |
| 2020/0059905 A1 * | 2/2020 | Tang | H04B 7/0486 |

(Continued)

OTHER PUBLICATIONS

Dave Morley, 5G Small Cells and Cable, Realizing the Opportunity, A Technical Paper prepared for SCTE•ISBE, 2018 (Year: 2018).*

(Continued)

*Primary Examiner* — Aristocratis Fotakis
(74) *Attorney, Agent, or Firm* — Patent Beach PC

(57) ABSTRACT

Apparatus and methods for increasing throughput in wireless systems and networks. In one embodiment, the apparatus and methods provide enhanced performance to 5G millimeter-wave user devices via expanded use of spatial multiplexing layers in various uplink (UL) operating modes, including transform precode and non-transform precode modes. In one implementation, the methods and apparatus described herein can be utilized with respect to a 3GPP 5G NR UE scheduled dynamically in UL transmission. In another implementation, the methods and apparatus described herein can be utilized with respect to the UE scheduled with a Configured Grant (CG) UL transmission.

20 Claims, 30 Drawing Sheets

(56) References Cited

U.S. PATENT DOCUMENTS

| | | | |
|---|---|---|---|
| 2020/0083939 A1* | 3/2020 | Park | H04L 5/0051 |
| 2020/0266928 A1* | 8/2020 | Yeo | H04L 1/0003 |
| 2020/0267667 A1* | 8/2020 | MolavianJazi | H04W 72/0446 |
| 2020/0280398 A1* | 9/2020 | Hwang | H04L 1/1887 |
| 2020/0322026 A1* | 10/2020 | Manolakos | H04W 76/27 |
| 2020/0351127 A1* | 11/2020 | Yokomakura | H04L 5/0053 |
| 2020/0389872 A1 | 12/2020 | Osawa et al. | |
| 2020/0396684 A1* | 12/2020 | Lin | H04W 52/0225 |
| 2021/0044385 A1* | 2/2021 | Hosseini | H04L 5/0094 |
| 2021/0314084 A1* | 10/2021 | Hwang | H04L 1/1854 |
| 2021/0368534 A1* | 11/2021 | Sato | H04W 72/569 |
| 2022/0030517 A1* | 1/2022 | Takahashi | H04W 52/0216 |
| 2022/0345261 A1* | 10/2022 | Ali | H04L 27/2636 |
| 2022/0376965 A1* | 11/2022 | Ramirez-Gutierrez | H04W 72/23 |
| 2023/0171763 A1* | 6/2023 | Gao | H04W 52/58 370/329 |

OTHER PUBLICATIONS

3GPP., "CG-Uplink Control Information (UCI) CG-UCI, as specified in Table 6.3.2.1-3", Technical Specification, ETSI, TS 138 212 (V15.2.0), Jul. 2018, 101 pages.

3GPP., "DMRS port specification 1700 for dmrs-Type=1, DMRSmax Length=1, rank=4, as specified in Table 7.3.1.1.2-11 (Release 15)", Technical Specification Group Radio Access Network, TS 38.214 (V15.11.0), Sep. 2020, 46 pages.

3GPP., "Multiplexing and channel coding (Release 15)", Technical Specification, TS 38.212 (V15.10.0), Sep. 2020, 21 pages.

3GPP., "New SID: Study on supporting NR from 52.6GHz to 71 GHz", 3GPP TSG RAN Meeting #86 (RP-193258), Dec. 2019, 3 pages.

3GPP., "NG-RAN—F1 application protocol (F1AP) Release 15", Technical Specification Group, TS 38.473 (V15.1.1), Apr. 2018, 106 pages.

3GPP., "Radio Resource Control (RRC) protocol specification (Release 16)", Technical Specification Group Radio Access Network, TS 38.331 (V16.0.0), Mar. 2020, 832 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

Cordeiro C., et al., "IEEE 802.11ad: Introduction and Performance Evaluation of the First Multi-Gbps WiFi Technology", mmCom '10, ACM, Sep. 24, 2010, pp. 3-7.

Ghasempour Y., et al., "IEEE 802.11ay: Next-Generation 60 GHz Communication for 100 GB/s Wi-Fi", IEEE Communication Magazine, Dec. 2017, pp. 186-192.

Nokia 5G New Radio (NR): Physical Layer Overview and Performance, IEEE Communication Theory Workshop, 2018 by A. Ghosh, May 15, 2018, 38 pages.

R1-2001541, Remaining Issues on UE Adaptation to Maximum MIMO Layers, 3GPP TSG RAN WG1 Meeting #100bis-e, Huawei, HiSilicon, Apr. 20-30, 2020.

R1-2002702, Summary of UE Adaptation to Maximum No. of MIMO Layers, Vivo, 3GPP TSG RAN WG1 Meeting #100bis-e, Apr. 20-30, 2020.

Rappaport T.S., et al., "Overview of Millimeter Wave Communications for Fifth-Generation (5G) Wireless Networks—with a focus on Propagation Models," IEEE Transactions on Antennas and Propagation, Special Issue on 5G, Nov. 2017, 15 pages.

* cited by examiner

| PUSCH-ServingCellConfig field descriptions |
|---|
| codeBlockGroupTransmission<br>Enables and configures code-block-group (CBG) based transmission (see TS 38.214 [19], clause 5.1.5). |
| maxMIMO-Layers<br>Indicates the maximum MIMO layer to be used for PUSCH in all BWPs of the normal UL of this serving cell (see TS 38.212 [17], clause 5.4.2.1). If present, the network sets maxRank to the same value. For SUL, the maximum number of MIMO layers is always 1, and network does not configure this field. The field maxMIMO-Layers refers to DCI format 0_1. |
| processingType2Enabled<br>Enables configuration of advanced processing time capability 2 for PUSCH (see 38.214 [19], clause 6.4). |
| rateMatching<br>Enables LBRM (Limited buffer rate-matching). When the field is absent the UE applies FBRM (Full buffer rate-matchingLBRM) (see TS 38.212 [17], clause 5.4.2). |
| xOverhead<br>If the field is absent, the UE applies the value 'xoh0' (see TS 38.214 [19], clause 5.1.3.2). |
| maxMIMO-LayersForDCI-Format0-2<br>Indicates the maximum MIMO layer to be used for PUSCH for DCI format 0_2 in all BWPs of the normal UL of this serving cell (see TS 38.212 [17], clause 5.4.2.1). If present, the network sets maxRankForDCI-Format0-2 to the same value. For SUL, the maximum number of MIMO layers is always 1, and network does not configure this field. |

FIG. 2A (Prior Art)

```
-- ASN1START
-- TAG-PUSCH-SERVINGCELLCONFIG-START

PUSCH-ServingCellConfig ::=    SEQUENCE {
    codeBlockGroupTransmission        SetupRelease { PUSCH-CodeBlockGroupTransmission }    OPTIONAL,    -- Need M
    rateMatching                      ENUMERATED {limitedBufferRM}                         OPTIONAL,    -- Need S
    xOverhead                         ENUMERATED {xoh6, xoh12, xoh18}                      OPTIONAL,    -- Need S
    ...,
    [[
    maxMIMO-Layers                    INTEGER (1..4)                                       OPTIONAL,    -- Need M
    processingType2Enabled            BOOLEAN                                              OPTIONAL     -- Need M
    ]],
    [[
    maxMIMO-LayersForDCI-Format0-2-r16    INTEGER (1..4)                                   OPTIONAL     -- Need M
    ]]
}

PUSCH-CodeBlockGroupTransmission ::=    SEQUENCE {
    maxCodeBlockGroupsPerTransportBlock    ENUMERATED {n2, n4, n6, n8},
    ...
}

-- TAG-PUSCH-SERVINGCELLCONFIG-STOP
-- ASN1STOP
```

FIG. 2B (Prior Art)

| ConfiguredGrantConfig IE |
|---|
| ... |
| *rrc-ConfiguredUplinkGrant*<br>Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously. |
| ... |

FIG. 3A

```
rrc-ConfiguredUplinkGrant           SEQUENCE {
    timeDomainOffset                    INTEGER (0..5119),
    timeDomainAllocation                INTEGER (0..15),
    frequencyDomainAllocation           BIT STRING (SIZE(18)),
    antennaPort                         INTEGER (0..31),
    dmrs-SeqInitialization              INTEGER (0..1)
        OPTIONAL,   -- Need R
    precodingAndNumberOfLayers          INTEGER (0..63),
    srs-ResourceIndicator               INTEGER (0..15)
        OPTIONAL,   -- Need R
    mcsAndTBS                           INTEGER (0..31),
    frequencyHoppingOffset              INTEGER (1..maxNrofPhysicalResourceBlocks-1)
        OPTIONAL,   -- Need R
    pathlossReferenceIndex              INTEGER (0..maxNrofPUSCH-PathlossReferenceRSs-1),
    ...,
    [[
    pusch-RepTypeIndicator-r16          ENUMERATED {pusch-RepTypeA, pusch-RepTypeB}
        OPTIONAL,   -- Need M
    frequencyHoppingPUSCH-RepTypeB-r16  ENUMERATED {interRepetition, interSlot}
        OPTIONAL,   -- Cond RepTypeB
    timeReferenceSFN-r16                ENUMERATED {sfn512}
        OPTIONAL,   -- Need R
    ]]
}
```

FIG. 3B (Prior Art)

```
ASN1START
-- TAG-MIMO-LAYERS-START

MIMO-LayersDL ::=    ENUMERATED {twoLayers, fourLayers, eightLayers}

MIMO-LayersUL ::=    ENUMERATED {oneLayer, twoLayers, fourLayers}

-- TAG-MIMO-LAYERS-STOP
-- ASN1STOP
```

FIG. 13A (Prior Art)

```
ASN1START
-- TAG-MIMO-LAYERS-START

MIMO-LayersDL ::=    ENUMERATED {twoLayers, fourLayers, eightLayers}

MIMO-LayersUL-r17 ::=    ENUMERATED {oneLayer, twoLayers, fourLayers, eightLayers}

-- TAG-MIMO-LAYERS-STOP
-- ASN1STOP
```

FIG. 13B

```
-- ASN1START
-- TAG-PUSCH-CONFIG-START

PUSCH-Config ::=        SEQUENCE {
    ...
    maxRank             INTEGER (1..4)              OPTIONAL,  -- Cond codebookBased
    ...
}
-- TAG-PUSCH-CONFIG-STOP
-- ASN1STOP
```

FIG. 14A (Prior Art)

```
-- ASN1START
-- TAG-PUSCH-CONFIG-START

PUSCH-Config ::=        SEQUENCE {
    ...
    maxRank             INTEGER (1..8)        OPTIONAL, -- Cond codebookBased
    ...
}
-- TAG-PUSCH-CONFIG-STOP
-- ASN1STOP
```

FIG. 14B

| Value | Number of DMRS CDM group(s) without data | DMRS port(s) |
|---|---|---|
| 0 | | 0-3 |
| 2-7 | Reserved | Reserved |

| Value | Number of DMRS CDM group(s) without data | DMRS port(s) |
|---|---|---|
| 0 | 2 | 0-3 |
| 1 | 3 | 0-5 |
| 2 | 4 | 0-7 |
| 3 | 8 | 0-15 |
| 4 | 16 | 0-31 |

- nrofSRS-Ports ENUMERATED {port1, ports2, ports4},

- nrofSRS-Ports ENUMERATED {port1, ports2, ports4, ports8},

| Field | Bitwidth |
|---|---|
| HARQ process number | 4 |
| Redundancy version | 2 |
| New data indicator | 1 |
| Channel Occupancy Time (COT) sharing information | $\lceil \log_2 C \rceil$ if both higher layer parameter UltoDL-CO-SharingED-Threshold-r16 and higher layer parameter cg-COT-SharingList-r16 are configured, where C is the number of combinations configured in cg-COT-SharingList-r16;<br><br>1 if higher layer parameter UltoDL-CO-SharingED-Threshold-r16 is not configured and higher layer parameter cg-COT-SharingOffset-r16 is configured;<br><br>0 otherwise; |

FIG. 20A (Prior Art)

| Field | Bitwidth |
|---|---|
| HARQ process number | 4 |
| Redundancy version | 2 |
| New data indicator | 1 |
| Channel Occupancy Time (COT) sharing information | $\lceil \log_2 C \rceil$ if both higher layer parameter UltoDL-CO-SharingED-Threshold-r16 and higher layer parameter cg-COT-SharingList-r16 are configured, where C is the number of combinations configured in cg-COT-SharingList-r16;<br><br>1 if higher layer parameter UltoDL-CO-SharingED-Threshold-r16 is not configured and higher layer parameter cg-COT-SharingOffset-r16 is configured;<br><br>0 otherwise; |
| Precoding and Number of Layers | INTEGER (0...63) [SEE TABLE 1500] |

2033

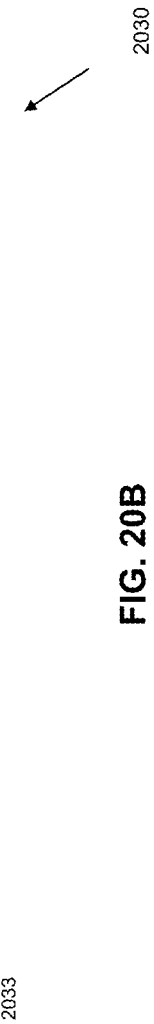

| Field | Bitwidth |
|---|---|
| HARQ process number | 4 |
| Redundancy version | 2 |
| New data indicator | 1 |
| Channel Occupancy Time (COT) sharing information | [log$_2$C] if both higher layer parameter UltoDL-CO-SharingED-Threshold-r16 and higher layer parameter cg-COT-SharingList-r16 are configured, where C is the number of combinations configured in cg-COT-SharingList-r16;<br>1 if higher layer parameter UltoDL-CO-SharingED-Threshold-r16 is not configured and higher layer parameter cg-COT-SharingOffset-r16 is configured;<br>0 otherwise; |
| Precoding and Number of Layers | INTEGER (0..63) [SEE TABLE 1500] |
| Number of Codewords | INTEGER (0..) = 0    {HARQ ID A}<br>{NDI A}<br>{RV A} |
| | INTEGER (0..) = 1    {HARQ ID A, HARQ ID B}<br>{NDI A, NDI B}<br>{RV A, RV B} |

FIG. 20C

APPARATUS AND METHODS FOR UPLINK MIMO ENHANCEMENT IN WIRELESS SYSTEMS

PRIORITY

This application is a continuation of, and claims priority to, co-owned and co-pending U.S. patent application Ser. No. 15/931,290 of the same title filed on May 13, 2020, and issuing as U.S. Pat. No. 11,088,741 on Aug. 10, 2021, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to enhancement of uplink transmission techniques for a radio network utilizing millimeter wave spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Additionally, the 5 GHz band has been allocated for use by, e.g., WLAN equipment.

User client devices (e.g., smartphones, tablets, phablets, laptops, smartwatches, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network or a mobile network operator (MNO) network). A user may generally access the network at a node or "hotspot," a physical location at which the user may obtain access by connecting to modems, routers, APs, etc. that are within wireless range.

Millimeter Wave Communications

NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, NG-RAN leverages technology and functions of extant LTE/LTE-A technologies, as bases for further functional development and capabilities. Furthermore, earlier Releases of 3GPP (e.g., Release 14) have laid the groundwork for many aspects of the 5G specification. For instance, one of the salient features of 5G is extending LTE into the millimeter wave (also referred to as "mmWave") frequency band (24 GHz-100 GHz). Utilizing millimeter wave frequency bands in 5G systems will provide 5G wireless channels with more than ten times greater bandwidth than 4G LTE 20 MHz channel, as well as supporting the requisite ultra-low latency (e.g., 1 ms roundtrip) specified for 5G systems. The higher bandwidth range in millimeter wave frequency bands can increase the effective data rates of the systems to hundreds of Mbps.

In addition to 3GPP 5G, the 57-64 GHz millimeter wave band is currently utilized by recent WLAN technologies; see e.g., IEEE Std. 802.11ad. Using these millimeter wave frequencies in WLAN can improve data throughput from e.g., 1 Gbps in the 5 GHz band to data rates on the order of 7 Gbps or higher. Competing technologies in 60 GHz unlicensed spectrum, such as IEEE Std. 802.11ay, support up to eight-layer SU-MIMO transmission.

Limited Uplink Capacity in 5G Millimeter Wave Systems

The 3GPP 5G network specifications include utilization of a range of spectrum frequencies, including the mmWave bands such as those of 28 GHz and 39 GHz. The mmWave frequencies provide the availability of very high associated data rates and plentiful spectrum, including as aggregated channel bandwidth of 1 GHz and higher. Systems utilizing the foregoing mmWave frequency bands offer the potential of such very high data rates by exploiting the large amount of available spectrum, coupled with the ability to encode greater amounts of data within any given spectrum due to the high frequency of the carrier(s). For instance, some bands provide 10 GHz of available spectrum, which is more than all the spectrum below 6 GHz currently (partially) used for cellular communications.

Due to this plentiful available mmWave spectrum, carriers and other operators want to expand usage of mmWave spectrum in conjunction with 3GPP 5G technology. The use of mmWave will allow increased network capacity and data sharing, including e.g., on backhauls from e.g., gNBs (5G base stations). Such backhauls are often the "bottlenecks" in network performance and throughput (as compared to the air interface between the UE and the gNB). Therefore, the increased bandwidth and spectrum of mmWave can be used to greatly enhance a carrier's network performance and data rate within such backhauls.

Moreover, the increased network capacity improves network Quality of Service (QoS). As previously noted, the increased bandwidth further reduces the overall latency associated with the network, and hence enables some remote applications (e.g., VR/AR, remote healthcare applications, and autonomous vehicles) to experience faster communications via the network.

Likewise, 5G NR contemplates use of mmWave frequencies between base stations or small cells and mobile devices (UEs), such as in dense urban areas, indoors such as malls or stadiums, and the like, acting in effect as a complement to longer-range sub-6 GHz band systems.

Compared with wireless systems utilizing spectrum below 6 GHz, a mmWave-based wireless system experiences substantially different physical characteristics, such as higher path loss and diffraction losses, and stronger directionality. For instance, resonances of oxygen and other gasses in the air may cause certain bands to suffer from comparatively high levels of atmospheric signal absorption, as can rain and snow. Moreover, mmWave frequencies typically suffer very heavy losses when propagating through other media such as building walls. See, e.g., "Overview of Millimeter Wave Communications for Fifth-Generation (5G) Wireless Networks—with a focus on Propagation Models," Rappaport, T. S., et al, *IEEE Transactions on Antennas and Propagation*, Special Issue on 5G, November 2017, which is incorporated herein by reference in its entirety, which describes various physical and path loss issues and models for mmWave systems. Hence, although the mmWave systems offer larger bandwidth and unprecedented data rates, achieving the promised data rates faces several challenges compared to the current 4G/LTE systems or other systems.

Notably, among the mm Wave frequencies, frequencies between 52.6 GHz-71 GHz are especially interesting because of their proximity to sub-52.6 GHz for which the extant 5G NR system is optimized. Hence, 3GPP Release 17 is currently extending 5G NR operation to the frequency range 52.6 GHz-71 GHz, see 3GPP RP-193258, entitled "NEW SID: Study on Supporting NR from 52.6 to 71 GHz", TSG RAN Meeting #86, Sitges, Spain, dated Dec. 9-12, 2019, which is incorporated herein by reference in its entirety. As described in RP-193258, frequencies above 52.6 GHz are faced with more difficult challenges than the frequency ranges below 52.6 GHz, such as higher phase noise, larger propagation loss, lower power amplifier efficiencies, strong power spectra, and density requirements.

In addition, 3GPP has initiated further study to define the required changes to 5G NR using the existing air DL/UL air interfaces to support operation between 52.6 GHz-71 GHz. Since these frequencies have a very short wavelength, it enables the use of large antenna arrays at both gNB and UE to be placed in a compact form, where each individual antenna element is placed at a short distance from the other antenna element in the array (at least equal to wavelength/2). For instance, for a 52 GHz waveform, the wavelength ($\lambda$) is on the order of 5.5 mm, and as such individual antenna element can be placed at a spacing of about 2-3 mm, thereby supporting very large numbers of individual antenna elements in very small areas. As such, the Multiple-Input-Multiple-Output (MIMO) transmission techniques, as studied in 3GPP, are required for transmitting multiple spatial layers on the same time-frequency resources to enable efficient data transmission in UL/DL in 52.6 GHz-71 GHz.

In the 4G LTE advanced system, UL transmission supports up to four (4) spatial layers and two codewords (each codeword is equivalent to one transport block) on a single Physical Uplink Shared Channel (PUSCH), where each codeword 102 can be mapped to two layers. That is, each of the multiple spatial layers utilizes common time-frequency resources of the OFDM air interface. The codeword-to-layer mapping can be used to split the data into layers (See FIG. 1). The number of layers created by layer mapping 104, which can be up to as many as antenna ports 106, defines the data rates for the UE 100.

In contrast, as described in 3GPP Release 15 and 16, the 5G NR UE 100 supports the transmission to the gNB 402 of up to four (4) layers and only a single codeword in Cyclic Prefix (CP)-OFDM mode (see FIG. 4A), while only a single layer is supported in transform precoding (i.e., Discrete Fourier Transform (DFT)-S-OFDM) mode (see FIG. 4B). As a brief aside, CP-OFDM is generally the "default" mode, with DFT-S-OFDM only being used by the UE when commanded by the gNB during instances of poor uplink coverage.

The foregoing generally forces a given 5G NR application into a dichotomy of either enhanced coverage (area) or enhanced data throughput. For example, if DFT-S-OFDM is selected on the UL to improve UL coverage, the aforementioned single MIMO layer limitation will severely throttle UL data rates which could otherwise be achievable via use of mmWave spectrum. So, it is effectively "coverage or data rate, but not both" under the existing solution when applied to mmWave.

Moreover, in existing 5G NR systems, the gNB instructs the UE on scheduling uplinks (e.g., data which is transmitted on the PUSCH) via Downlink Control Information (DCI) format. In "dynamic" scheduling, the PUSCH-ServingCell-Config IE configures UE-specific PUSCH parameters of a serving cell, including maximum number of MIMO layers (up to 4) when the UE is scheduled with DCI Format 0_1, as described in 3GPP TS 38.331 v16.0.0; see FIGS. 2A-2B. As shown in FIG. 2B, the maximum of number of MIMO layers allowed for UL (i.e., UE to gNB) transmission is limited to 4.

In 5G NR, the UE can also be configured in Configured Grant (CG)-PUSCH mode. In CG-PUSCH mode, resources are allocated to the UE by the gNB, and the UE uses these resources to transmit data on the PUSCH directly to the gNB (i.e., without transmitting scheduling request (SR)). As shown in FIG. 3A-3B, when the UE is configured in CG mode, the MIMO precoding matrix and the number of UL layers is specified in the precodingAndNumberOfLayers parameter (an integer in range 1 to 63, communicating both precoding and layer configuration). The interpretation of this integer is the same as the interpretation of precoding and layer information indicated in the precoding and layer information field in DCI Format 0_1 for a scheduled PUSCH, described above.

Hence, since the proposed 52.6-71 GHz frequency range enables the use of large antenna arrays at the UE, and the extant 5G NR specifications define only 1 MIMO layer (in the case of the UE using DFT-S-OFDM), and only 4 layers (in the case of the UE using CP-ODFM), the UE cannot achieve anywhere near the theoretical maximum throughputs provided via use of large antenna arrays when operating in mmWave bands. As such, the high quality of service, very high data rates, and low latency expected from use of the increased bandwidth afforded by mmWave frequencies is largely frustrated.

Accordingly, there exists a need for an improved apparatus and methods for increasing throughput within wireless systems such as e.g., 5G NR unlicensed systems. Specifically, what is needed are, inter alia, methods and apparatus to efficiently increase the 5G NR UL throughput in association with use of larger antenna element arrays, while not requiring fundamental changes to the underlying architecture or protocols. Ideally, such improved methods and apparatus would also not force operation to support either (but not both) of coverage and throughput, but rather could enable both enhanced throughput and coverage simultaneously.

SUMMARY

The present disclosure addresses the foregoing needs by providing, inter alia, methods and apparatus enhancing data throughput and/or coverage in a wireless network.

In one aspect of the disclosure, MIMO-based enhancements including increasing the number of spatial layers that can be transmitted on an UL within a 3GPP 5G NR system are described. In one variant, these enhancements are applied within devices (e.g., 5G NR-compliant UE) operating in the mmWave spectrum (e.g., above 50 Ghz). In one implementation thereof, multiples of 2 (e.g., 8 or 16) UL MIMO layers are provided during closed-loop spatial multiplexing operation, with the improved UE comprising an equivalent number (e.g., 8 or 16) of antenna ports.

In another aspect of the disclosure, enhanced layer and codeword capability is provided for multiple possible selections of UL operating mode. In one embodiment, the enhanced capability expands the extant 4-layer/single codeword configuration associated with current 5G NR (Release 15/16) Cyclic Prefix (CP)-OFDM mode, as well as expanding on the single layer limitation currently supported in transform precode (i.e., Discrete Fourier Transform (DFT)-S-OFDM) mode.

In another aspect a computerized mobile device employing multiple antenna elements and multiple antenna ports and configured for use within a wireless network is disclosed. In one embodiment, the computerized mobile device includes: digital processor apparatus; wireless interface apparatus in data communication with the digital processor apparatus and configured for wireless communication using the multiple antenna elements and multiple ports at the computerized mobile device with a radio area network (RAN) utilizing a wireless access technology; a multiple antenna element module in data communication with the digital processor apparatus, and storage apparatus in data communication with the digital processor apparatus and comprising a storage medium, the storage medium comprising at least one computer program.

In one variant, the at least one computer program is configured to, when executed on the digital processor apparatus, employ multiple antenna elements and associated ports to establish data communication with a network entity (e.g., enhanced gNB) associated with the RAN, such as via a PUSCH.

In another variant, the at least one computer program is configured to, when executed on the digital processor further includes enable the computerized mobile device to establish communications with the RAN using enhanced spatial multiplexing techniques in either CP-OFDM or DFT-S-OFDM modes.

In one implementation, the computerized mobile device comprises a 5G NR capable UE (user equipment) which is equipped to operate in mmWave frequency ranges (e.g., 52.6-71 GHz).

In another aspect of disclosure, an enhanced Multiple-Input-Multiple-Output (MIMO) transmission framework for use within a wireless network is disclosed. In one embodiment, the wireless network utilizes 3GPP 5G protocols, and the transmission framework enables specification of one or more parameters relating to increasing number of layers in UL transmission for User Devices (UEs) within the network. In one variant, the increasing number of layers is implemented via specification of new or modified Information Elements (IEs) data within the framework, in conjunction with enhanced UEs having an increased number of antenna ports.

In one implementation, the network is operated by a multiple systems operator (MSO), and is configured to utilize at least one of quasi-licensed or unlicensed spectrum.

In one implementation, the IE PUSCH_ServingCellConfig is enhanced to increase the number of layers in UL transmission.

In another implementation, a MIMO layer information element (IE) protocol is enhanced to enable an increase in the number of layers in UL transmission.

In another implementation, a PUSCH configuration IE is enhanced to enable an increase in the number of layers in UL transmission.

In another implementation, a number of Demodulation Reference Signals (DRS) and associated Code Division Multiplexing (CDM) groups are increased according to the increased number of layers in UL transmission.

In another aspect, a method for operating an enhanced UE employing multiple antennas in a wireless network is disclosed. In one embodiment, the method includes: measuring MIMO channel via receiving reference signals; analyzing the measured channel samples to determine the maximum number of spatial layers that can be supported by the MIMO channel; notifying a base station of the maximum number of spatial layers; configuring the UE for MIMO transmission including the maximum number of spatial layers in UL by the base station; and transmitting data in UL to the base station using the MIMO transmission configuration.

In one embodiment, the MIMO transmission configuration includes 3GPP pre-defined transform precoding techniques, such as DFT-S-OFDM.

In another embodiment, if the base station notifies the UE to cancel the transform precoding, the UE falls back to the its previous MIMO transmission technique (e.g., CP-OFDM) including the previous number of layers used for transmission in UL.

In another embodiment, the method includes operating the enhanced UE using dynamic scheduling in the UL by the network.

Alternatively, in a further embodiment, the method includes operating the enhanced UE in the UL via scheduling based on Configured Grant (CG) resources by the network. In one such implementation, when the UE is configured with CG resources, the UE may reevaluate the number of layers that it can utilize to transmit data in the UL, and decide to decrease the number of layers, including notifying the base station of the decrease.

In another aspect of the disclosure, an enhanced UE (user equipment) apparatus, or $UE_e$, for use within a wireless network is disclosed. In one embodiment, the $UE_e$ includes both 4G/4.5G E-UTRAN-based and 5G NR-based wireless interfaces and associated protocol stacks, and is configured to support a large array of antenna elements for transmission and reception of data in mmWave frequency ranges. In one variant, the $UE_e$ is configured to operate its 5G NR interface(s) within the 52.6-71 GHz range, and includes enhancement logic to enable use of increased layerization in various uplink modes including dynamic and pre-scheduled modes.

In one variant, the $UE_e$ is configured as a user mobile device (e.g., smartphone or tablet). In another variant, the $UE_e$ is configured as a CPE (consumer premises equipment) such as a fixed wireless access (FWA) device mounted on a pole or rooftop or building façade, and used to support other wireline or wireless premises devices such as WLAN APs/routers, or MSO set-top boxes.

In another aspect of the disclosure, a wireless access node is disclosed. In one embodiment, the node includes a 3GPP-compliant (e.g., 5G Release-17 compliant) gNB and includes: a receiver module, a transmitter module, a plurality of antenna elements, and a MIMO logic module. In one variant, the gNB may further include: a processor apparatus; a wireless modem chipset in data communication with processor apparatus; a program memory in data communication with processor apparatus; an RF front end module; and a network interface module in data communication with a core network such as for e.g., backhaul of the access node. In further implementation, the program memory includes at least one program which is configured to, when executed to the processor apparatus, causes transmission and reception of communication signals in support of MIMO signaling and processing functions of an enhanced mmWave-capable 5G UE.

In another embodiment, the node includes a 5G NR gNB having at least one CU (controller unit) and a plurality of DU (distributed units) in data communication therewith. In one variant, the MIMO enhancement logic is disposed within one or more of the DU. In another variant, the logic is divided between one or more of the DU and the CU for that gNB.

In another aspect of disclosure, computer readable apparatus is disclosed. In one embodiment, the apparatus includes a storage medium configured to store one or more computer program. In embodiment, the apparatus includes a program memory or HDD or SDD on a computerized controller device, such as MSO controller. In another embodiment, the apparatus includes a program memory, HDD or SDD on a computerized access node (e.g. gNB or UE).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device. In some variants, the foregoing IC includes logic implementing selective MIMO enhancement for a mmWave-capable 5G NR UE. In other variants, the foregoing IC includes logic implementing selective MIMO enhancement for a Release-17 compliant gNB.

In a further aspect, enhanced protocols useful for signaling UE MIMO/layer capabilities/configuration, and instructing UE how to configure themselves for multi-layer operation, are disclosed. In one embodiment, the protocols comprise enhanced or expanded capability IEs used for UE and UL channel configuration and scheduling under earlier releases (e.g., Release 15 or 16).

In yet another aspect of the disclosure, and air interface module is disclosed. In one embodiment, the air interface module includes a plurality of short-wavelength (e.g., mmWave) antenna elements served by a plurality of ports of an RF front end and supporting baseband chipset. In one variant, the module includes a large number (e.g., 16 or greater) antenna elements and a like number of antenna ports which are accessible by the UE on UL transmissions via multiple layer processing in either CP-OFDM or precode transform (e.g., DFT-S-OFDM) modes of operation, thereby enhancing data throughput regardless of the mode selected. In one implementation, the antenna elements are configured for operation within the 52.6-71 GHz band.

In another aspect, methods and apparatus for increasing a maximum uplink transport block size are disclosed. In one embodiment, UL parameters such as the maximum number of MIMO layers on a PUSCH, the UE's maximum number of layers, and a rank parameter are configured with enhanced range, thereby dictating the larger maximum block size which scales automatically under existing protocols.

In a further aspect of the disclosure, an improved data structure (e.g., DCI Format 0_1 format) is disclosed. In one embodiment, an existing number of bits in the structure (e.g., 6) is utilized to encode a plurality of different precode matrix and layer number combinations, including layer numbers above 4 for UL CP-OFDM mode operation. In another embodiment, additional bits are added to enable encoding of a larger number of precode matrix/layer number combinations, such as for very large mmWave MIMO arrays (e.g., 8-bits, 10-bits, etc.). In one variant, reserved fields are used to support the additional combinations.

In yet another aspect, a method of enhancing UL data throughput for PUSCH scheduled or configured grants is disclosed. In one embodiment, additional CG UCI data is included with the CG-PUSCH transmission which encodes both the precode matrix and number of layers to be used for decoding by the gNBe. In some variants, codeword data is also included which can signal the use of multiple codewords (and hence multiple other codeword-specific UCI data values such as RV or NDI or HARQ bits).

These and other aspects shall become apparent when considered in light of the disclosure provided herein.

BRIEF DESCRIPTION OF THE DRAWINGS

FIG. 2A is a first tabular representation of exemplary prior art 3GPP PUSCH-ServingCellConfig information element (IE).

FIG. 2B is a graphical representation of exemplary prior art 3GPP PUSCH-ServingCellConfig IE parameters.

FIG. 3A is a tabular representation of exemplary prior art 3GPP ConfiguredGrantConfig IE.

FIG. 3B is a graphical representation of exemplary prior art 3GPP ConfiguredGrantConfig parameters.

FIG. 13A is a graphical representation of exemplary prior art 3GPP MIMO-Layers parameter IE.

FIG. 13B is a graphical representation of exemplary embodiment of an enhanced 3GPP MIMO-Layers parameters IE according to the disclosure.

FIG. 14A is a graphical representation of exemplary prior art 3GPP PUSCH-Config parameter IE.

FIG. 14B is a graphical representation of exemplary embodiment of an enhanced IE PUSCH-Config parameter IE according to the disclosure.

FIG. 17A is a graphical representation of exemplary prior art DMRS specification which can support a maximum of 4 layers.

FIG. 17B is a graphical representation of exemplary embodiment of an enhanced DMRS specification according to the present disclosure.

FIG. 20A is a tabular representation of exemplary prior art UCI information set.

FIG. 20B is a tabular representation of a first exemplary embodiment of an enhanced UCI information set according to the disclosure.

FIG. 20C is a tabular representation of a second exemplary embodiment of an enhanced UCI information set according to the disclosure.

Figure 1:
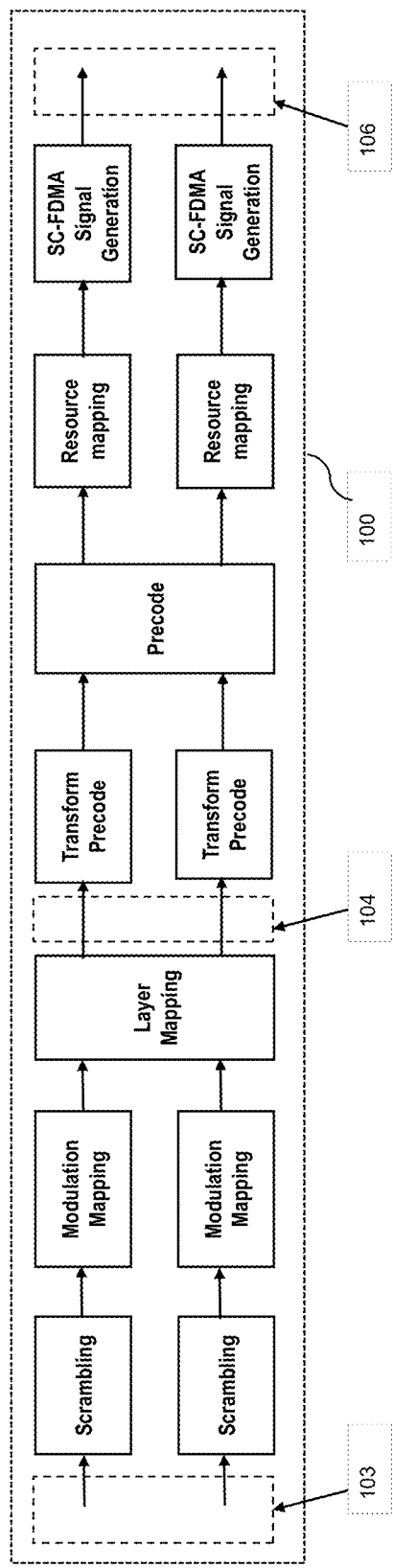
FIG. 1 is a block diagram illustrating one exemplary prior art configuration of a 3GPP MIMO UL transmission chain of an OFDM-based UE.
Figure 4A:
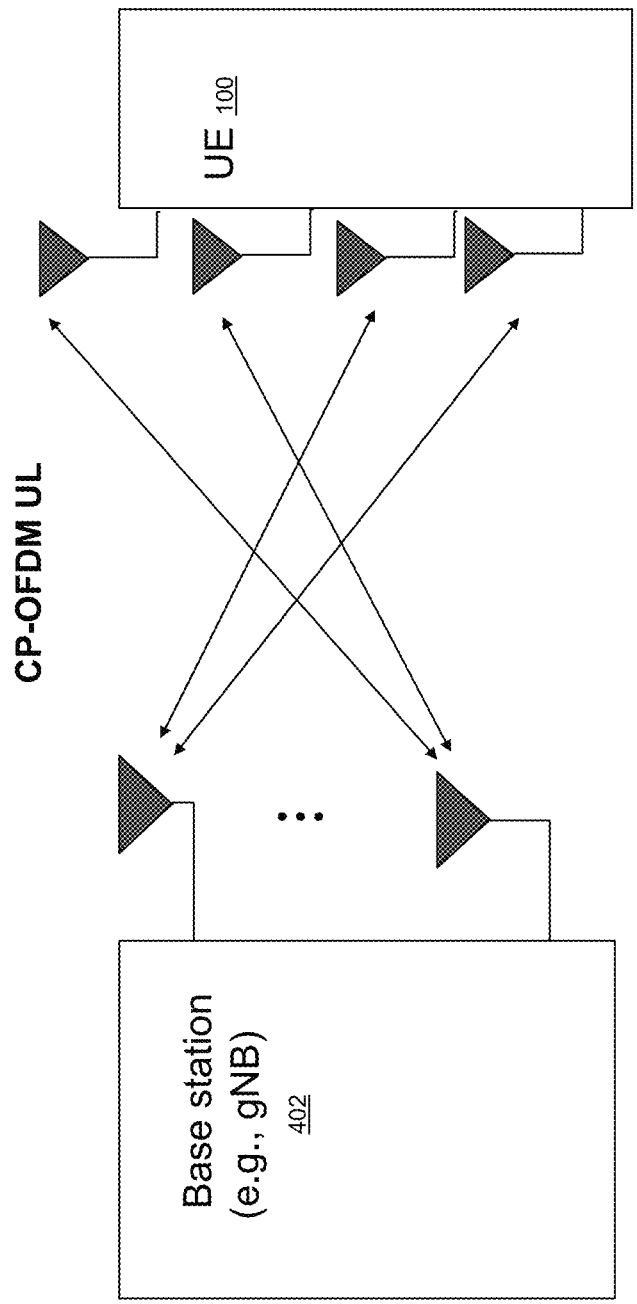
FIG. 4A is a block diagram illustrating a prior art architecture including UE and gNB, illustrating CP-OFDM UL operation using a maximum of four layers.
Figure 4B:
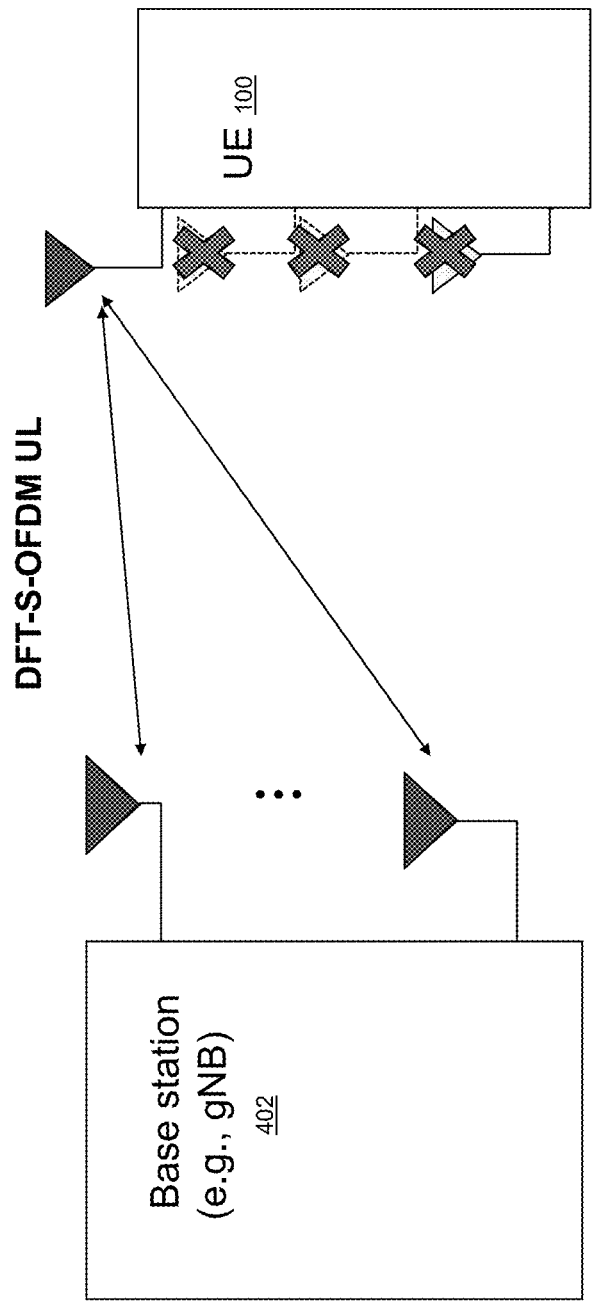
FIG. 4B is a block diagram illustrating a prior art architecture including UE and gNB, illustrating precode transform (e.g., DFT-S-OFDM) UL operation using a maximum of one layer.

All figures © Copyright 2020 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, wireless nodes such as FWA devices or femtocells/smallcells, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, spin-RAM and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, GPUs (graphics processing units), gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "mmWave" refers to, without limitation, any device or technology or methodology utilizing millimeter wave spectrum between 24 GHz and 300 GHz.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15-17 as applicable, and any modifications, subsequent Releases, or amendments or supplements thereto which are directed to New Radio technology, whether licensed or unlicensed, as well as any related technologies such as 5G NR-U.

As used herein, the term "quasi-licensed" refers without limitation to spectrum which is at least temporarily granted, shared, or allocated for use on a dynamic or variable basis, whether such spectrum is unlicensed, shared, licensed, or otherwise.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the terms "unlicensed" and "unlicensed spectrum" refer without limitation to radio frequency spectrum (e.g., from the sub-GHz range through 100 GHz) which is generally accessible, at least on a part time basis, for use by users not having an explicit license to use, such as e.g., ISM-band, 2.4 GHz bands, 5 GHz bands, 6 GHz bands, quasi-licensed spectrum such as CBRS, 60 GHz (V-Band) and other mmWave bands, 5G NR-U bands, and others germane to the geographic region of operation (whether in the U.S. or beyond) that will be appreciated by those of ordinary skill given the present disclosure.

As used herein, the term "Wi-Fi" refers to, without limitation and as applicable, any of the variants of IEEE Std. 802.11 or related standards including 802.11 a/b/g/n/s/v/ac/ad/ax/ay, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides methods and apparatus for providing wireless services which, inter alia, provide enhancement over extant UL functionality during utilization of mmWave spectrum. Specifically, UL data throughput and/or coverage are enhanced in various UL operating modes for mmWave-enabled devices, including user devices with multiple antennas and MIMO capability.

In one embodiment, an enhanced MIMO transmission framework, which employs large antenna arrays and additional spatial layers in the UL to enhance capacity, is provided. For instance, in one implementation, the framework includes provision for use of an increased number of spatial multiplexing layers in the UL for both transform precode (e.g., DFT-S-OFDM) and non-transform precode (e.g., CP-OFDM) modes, within the 52.6 GHz-71 GHz spectrum specified for 3GPP 5G NR Release-17.

Specifically, in one implementation, an enhanced 5G NR UE employing CP-OFDM utilizes a shared and dynamically allocated uplink channel (PUSCH) based on associated DCI format signaling for UL transmission of data from the UE to a gNB.

In a second implementation, multiple UL spatial layers are supported when the enhanced UE is applying transform precoding such as DFT-S-OFDM, thereby providing higher data capacity than extant single-layer capabilities when the UE is utilizing transform precoding for better UL coverage.

In yet another implementation, the enhanced UE utilizes one or more configured grant (CG) PUSCH channels for the UL transmission of data from the UE to the gNB, with a configurable number of spatial layers and/or codewords. In one such configuration, one or more additional fields (which indicates precoding and layer configuration, and codeword configuration if desired) are used within the CG-Uplink Control Information (UCI).

Detailed Description of Exemplary Embodiments

Exemplary embodiments of the apparatus and methods of the present disclosure are now described in detail. While these exemplary embodiments are described in the context of a managed network of a service provider (e.g., MSO and/or MNO networks), it will be recognized that other types of radio access technologies ("RATs"), other types of networks and architectures that are configured to deliver digital data (e.g., files, text, images, games, software applications, video and/or audio/voice) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises, or one mobile in nature), the present disclosure may be readily adapted to other types of environments including, e.g., outdoors, commercial/retail, or enterprise domain (e.g., businesses), or even governmental uses. Yet other applications are possible.

Moreover, while described in the context of unlicensed (e.g., mmWave) spectrum, it will be appreciated by those of ordinary skill given the present disclosure that various of the methods and apparatus described herein may be applied to spectrum within a licensed or quasi-licensed spectrum context (e.g., such as where the spectrum is temporarily granted to one or more users and may be subsequently withdrawn).

Further, while some aspects of the present disclosure are described in detail with respect to so-called 5G "New Radio" (3GPP Release 17 and TS 38.XXX Series Standards and beyond), some aspects are generally access technology "agnostic" and hence may be used across different access technologies, and can be applied to, inter alia, any type of P2MP (point-to-multipoint) or MP2P (multipoint-to-point) technology.

Other features and advantages of the present disclosure will immediately be recognized by persons of ordinary skill in the art with reference to the attached drawings and detailed description of exemplary embodiments as given below.

Uplink MIMO Enhancement Architectures and Apparatus

Figure 5:
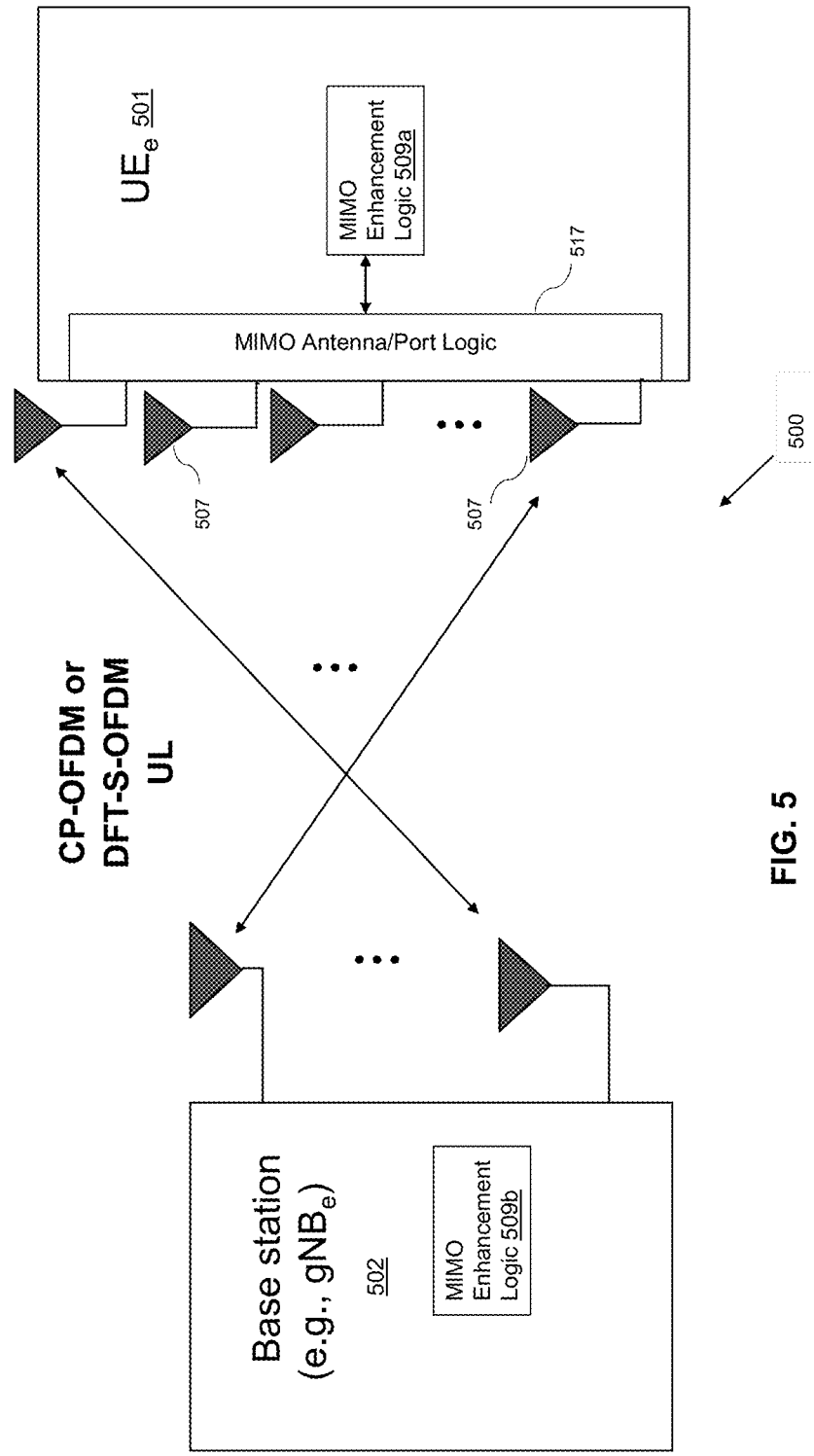
FIG. 5 is a block diagram illustrating one embodiment of a network architecture with enhanced MIMO functionality (including $UE_e$ and $gNB_e$) according to the present disclosure.

Referring to FIG. 5, one embodiment of an enhanced 5G NR Release 17-based architecture 500 according to the present disclosure is shown and described.

As illustrated, the architecture 500 includes one or more 5G UE (UEe) devices 501 with enhanced MIMO functionality, as well as one or more enhanced gNBs (gNBe). The architecture 500 is compliant with 3GPP Release 17, and includes an antenna array 507 that has a comparatively larger number of antenna elements 507 (and associated ports within the port logic 517), e.g., five or more. The UEe 505 can transmit data in the UL to the base station 502 (e.g., gNBe) using in one embodiment up to the maximum number of spatial multiplexing layers supported by its antenna/port configuration (e.g., 6, 8, 16, or yet higher numbers). As discussed in greater detail subsequently herein, the number of spatial multiplexing layers (and hence ports and antenna elements) is both configurable and mode-dependent, such that the UE (in conjunction with the gNBe) selectively configure its UL for maximal performance. As referenced previously herein, the prior art (Release 15/16) limitations or tradeoffs regarding coverage versus data throughput are advantageously eliminated in the architecture 500 of FIG. 5, since multiple spatial layers are available in varying different modes of UL operation (including CP-OFDM and DFT-S-OFDM).

The MIMO enhancement modules or logic 509a, 509b enable the UEe 501 and gNBe respectively to manage and supervise transmission of data in "closed loop" spatial multiplexing mode(s) in the UL, including use of up to prescribed maximum of spatial multiplexing layers which is correlated to the UEe's particular capability in terms of MIMO antenna elements and ports, which under Release 17 may greatly exceed the e.g., 4 maximum layers of earlier revisions' CP-OFDM mode (and the single-layer maximum of DFT-S-OFDM).

Figure 5A:
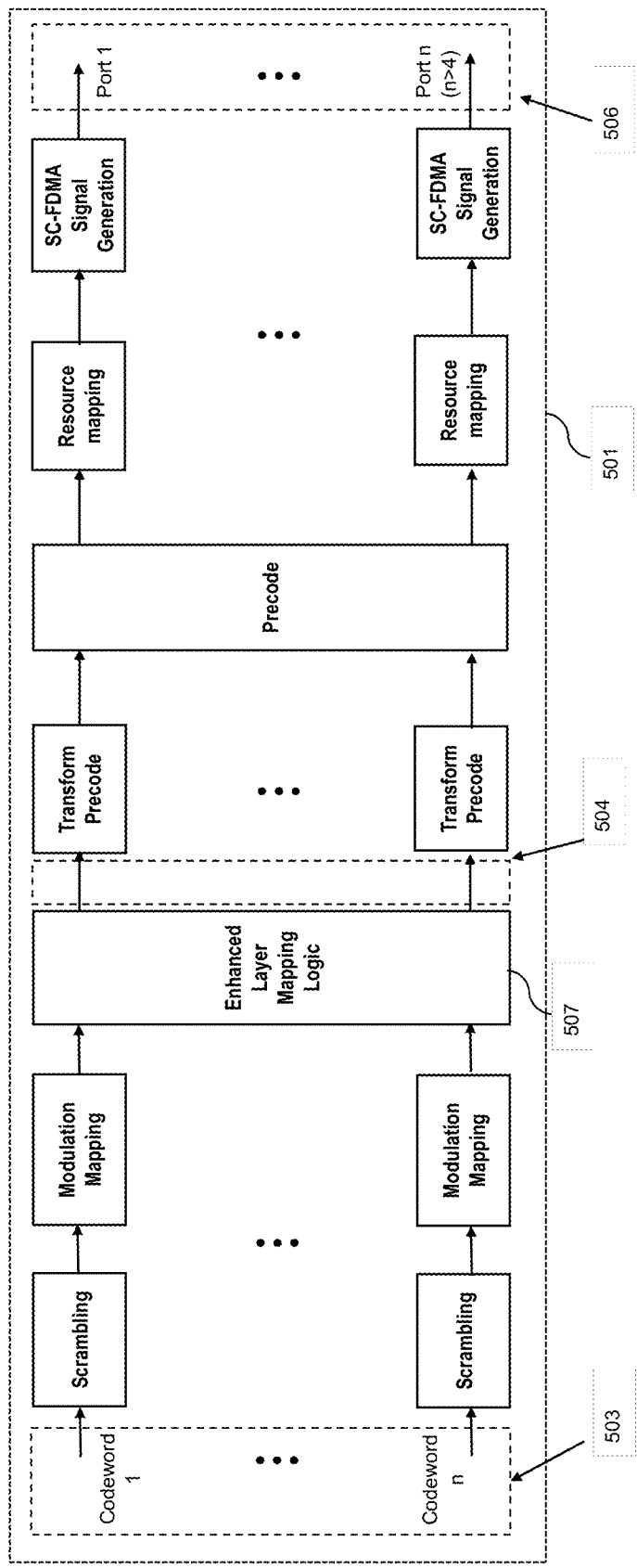
FIG. 5A is a block diagram illustrating one exemplary configuration of a 3GPP 5G NR MIMO UL transmission chain of an OFDM-based mmWave-capable $UE_e$ according to the present disclosure.

FIG. 5A is a block diagram illustrating one exemplary configuration of a 3GPP 5G NR MIMO UL transmission chain of an OFDM-based mmWave-capable UEe according to the present disclosure. As shown, the transmit chain is modified from that of FIG. 1 to include, inter alia, (i) enhanced support of (input) codewords 503, (ii) enhanced layer mapping logic 507 which enables mapping to a greater number of layers (e.g., two per codeword, or more), and an increased number of antenna/spatial multiplexing ports 506 which may support e.g., large arrays of mmWave-compatible antenna elements (e.g., where $\lambda/2$ is on the order of a few mm).

UE$_e$ Apparatus

Figure 6:
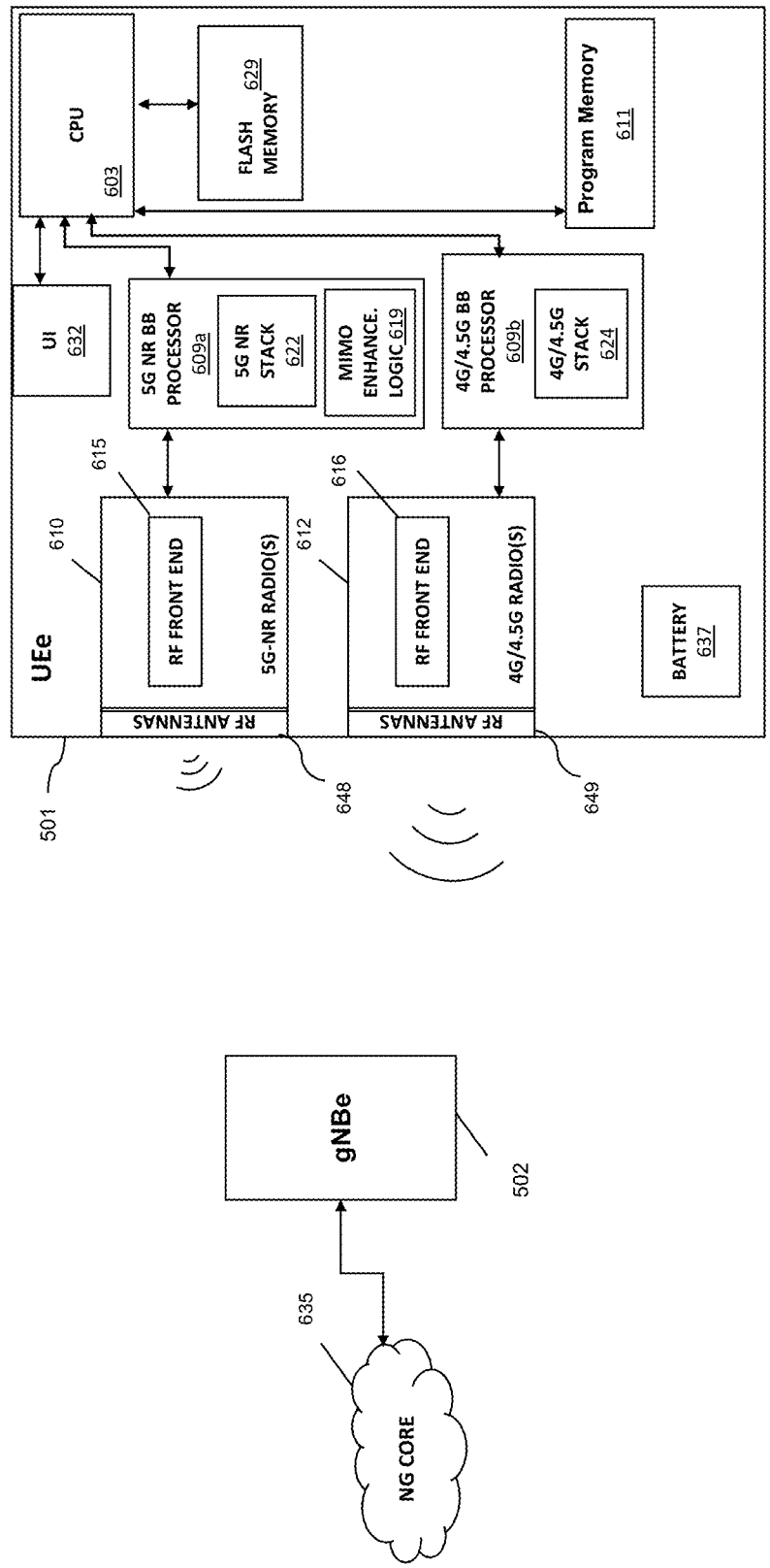
FIG. 6 is a functional block diagram illustrating one embodiment of a user device (e.g., enhanced UE or user equipment such as a 5G NR-enabled mobile device) configured according to the disclosure.

FIG. 6 illustrates a block diagram of an exemplary embodiment of an enhanced user device such as a 5G NR UE 501 equipped for mmWave communication, useful for operation in accordance with the present disclosure.

In one exemplary embodiment as shown, the UEe 501 includes, inter alia, a processor apparatus or subsystem such as a CPU 603, flash memory or other mass storage 629, a program memory module 611, 4G baseband processor module 609b with 4G/4.5G stack 624, 5G baseband processor module 609a with 5G NR stack 622 and MIMO enhancement logic 619 (here also implemented as software or firmware operative to execute on the processor 609a), and 5G wireless radio interface 610 and 4G/4.5G radio interface 612 for communications with the relevant RANs (e.g., 5G-NR RAN and 4G/4.5G RAN) respectively, and ultimately the EPC or NG Core 635 as applicable. The RF interfaces 610, 612 are configured to comply with the relevant PHY standards which each supports, and include an RF front end 610, 616 and antenna(s) elements 648, 649 tuned to the desired frequencies of operation (e.g., 52.6-71 GHz for the 5G array, and e.g., 5 GHz for the LTE/LTE-A bands). Each of the UE radios include multiple spatially diverse individual elements in e.g., a MIMO- or MISO-type configuration, such that spatial diversity of the received signals can be utilized. For example, an exemplary Qualcomm QTM052 mmWave antenna module may be used within the UE device for mmWave reception and transmission. Beamforming and "massive MIMO" may also be utilized within the logic of the UE device, in addition to the enhanced UL MIMO capabilities described herein.

In one embodiment, the various processor apparatus 603, 609a, 609b may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 609a.

The various BB processor apparatus 609a, 609b may also comprise an internal cache memory, and a modem. As indicated, the UEe 501 in one embodiment includes a MIMO Enhancement module 619 in the BB device memory which is in communication with the BB processing subsystem, e.g., as SRAM, flash and/or SDRAM components.

The program memory module 611 may implement one or more of direct memory access (DMA) type hardware, so as to facilitate data accesses as is well known in the art. The memory module of the exemplary embodiment contains one or more computer-executable instructions that are executable by the CPU processor apparatus 603.

Other embodiments may implement the MIMO Enhancement module/logic 619 functionality within dedicated hardware, logic, and/or specialized co-processors (not shown). In another embodiment, the module logic 619 is integrated with the CPU processor 603 (e.g., via on-device local memory, or via execution on the processor of externally stored code or firmware).

In some embodiments, the UE also utilizes memory 611 or other storage configured to temporarily hold a number of data relating to e.g., the various network/gNBe configurations for UL MIMO and/or various modes. For instance, the UEe may recall data relating to particular CP-OFDM or DFT-S-OFDM layer and codeword/precode configurations used with a given gNBe or RAN from storage.

gNBe Apparatus

Figure 7:
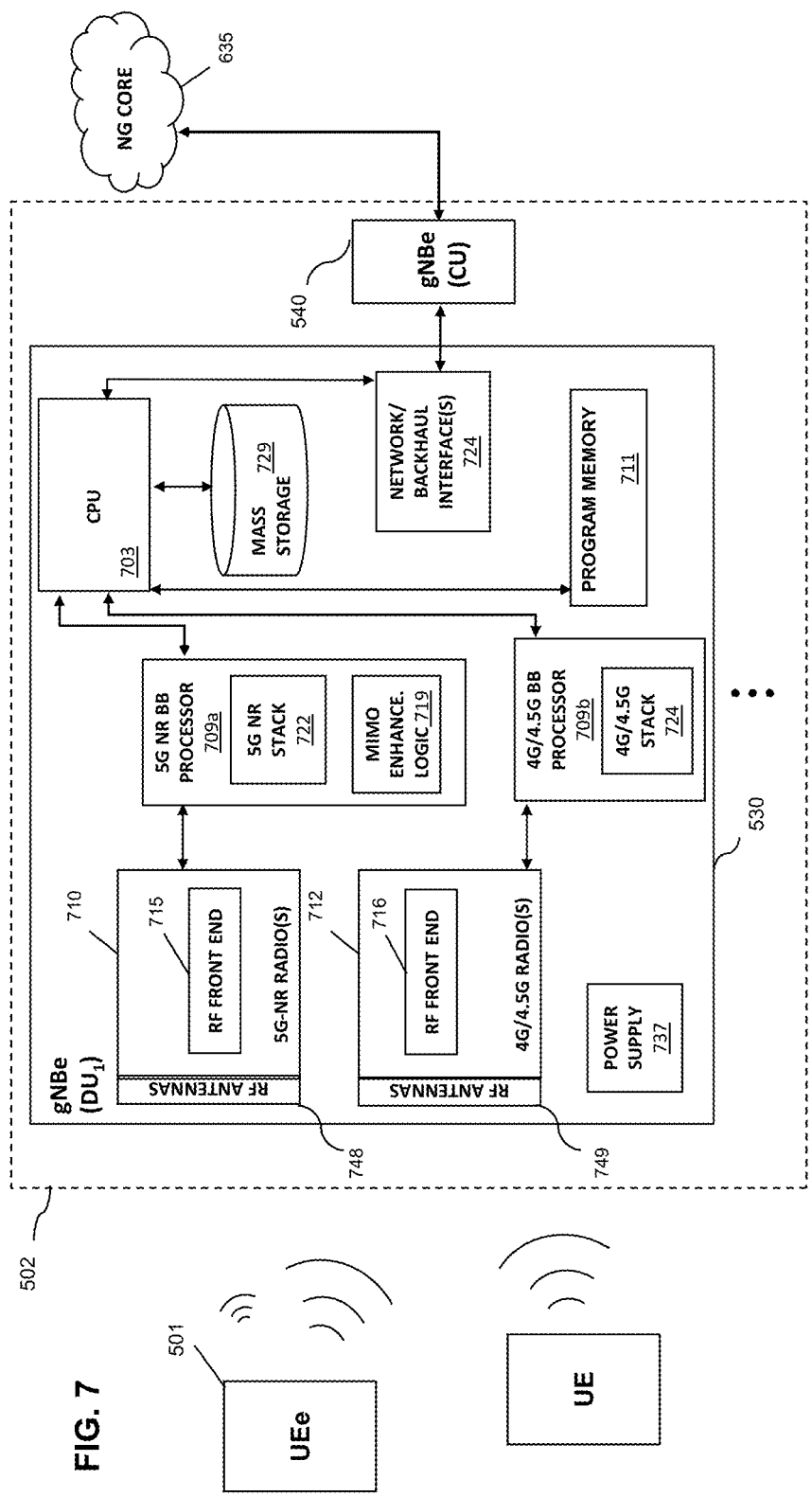
FIG. 7 is a functional block diagram illustrating one embodiment of a wireless access node (e.g., enhanced base station or 3GPP 5G NR $gNB_e$) configured according to the disclosure.

FIG. 7 illustrates a block diagram of an exemplary embodiment of an enhanced 5G NR-enabled gNBe apparatus, useful for operation in accordance with the present disclosure.

In one exemplary embodiment as shown, the gNBe 502 is comprised of one or more enhanced DU (distributed units) 530, and a CU (controller unit) 540 in data communication therewith, the latter in communication with the NGC 635 via a backhaul interface such as a fiber drop, DOCSIS cable modem, or even another mmWave system (such as one operating at a different frequency).

In this embodiment, the enhanced DU (DUe) 530 includes, inter alia, a processor apparatus or subsystem (CPU) 703, mass storage 729, a program memory module 711, 4G/4.5G baseband processor module 709b with 4G/4.5G stack 724, 5G baseband processor module 709a with 5G NR stack 722 and MIMO enhancement logic 719 (here also implemented as software or firmware operative to execute on the processor 709a), and 5G wireless radio interface 710 and 4G/4.5G radio interface 712 for communications with the relevant UE (e.g., 5G-NR UE/UEe and 4G/4.5G UE, which may be integrated as shown in FIG. 6) respectively. The RF interfaces 710, 712 are configured to comply with the relevant PHY standards which each supports, and include an RF front end 710, 716 and antenna(s) elements 748, 749 tuned to the desired frequencies of operation (e.g., 52.6-71 GHz for the 5G array, and e.g., 5 GHz for the LTE/LTE-A bands). The DUe's 530 each also include a local power supply 737.

Each of the gNBe radios include multiple spatially diverse individual elements in e.g., a MIMO- or MISO-type configuration, such that spatial diversity of the received signals can be utilized. For example, the aforementioned exemplary Qualcomm QTM052 mmWave antenna module may be used within the gNBe device 502 for mmWave reception and transmission. Beamforming and "massive MIMO" may also be utilized within the logic of the gNBe device, in addition to the enhanced UL MIMO capabilities described herein.

The gNBe also includes logic for signaling the relevant UEe with UEe-specific UL MIMO configuration data, and likewise for receiving UEe-specific configuration and capability data as described elsewhere herein.

In one embodiment, the various processor apparatus 703, 709a, 709b may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 709a.

The various BB processor apparatus 709a, 709b may also comprise an internal cache memory, and a modem. As indicated, the gNBe 502 in one embodiment includes a MIMO Enhancement module 719 in the BB device memory which is in communication with the BB processing subsystem, e.g., as SRAM, flash and/or SDRAM components.

The program memory module 711 may implement one or more of direct memory access (DMA) type hardware, so as to facilitate data accesses as is well known in the art. The memory module of the exemplary embodiment contains one or more computer-executable instructions that are executable by the CPU processor apparatus 703.

Other embodiments may implement the MIMO Enhancement module/logic 719 functionality within dedicated hardware, logic, and/or specialized co-processors (not shown). In another embodiment, the module logic 719 is integrated with the CPU processor 703 (e.g., via on-device local memory, or via execution on the processor of externally stored code or firmware).

In some embodiments, the gNBe 502 also utilizes memory 711 or other storage configured to temporarily hold a number of data relating to e.g., the various UEe identities and configurations for UL MIMO and/or various modes. For instance, the gNBe may recall data relating to particular CP-OFDM or DFT-S-OFDM layer and codeword/precode configurations used with a given UEe from storage and use this as the basis for configuring the same UEe again (or even another similar UEe).

It will be appreciated that since the gNBe (e.g., each DUe) is less restrictive on space than the typical UEe 501 (e.g., mobile device), the DUe may contain a higher number of antenna elements and associated ports, and accordingly higher spatial layer capability of desired. For instance, the DUe may contain 64, 128 or more antenna elements and be supported by multiple BB chipsets and RF front ends.

Distributed gNB Architectures

Figure 8A:
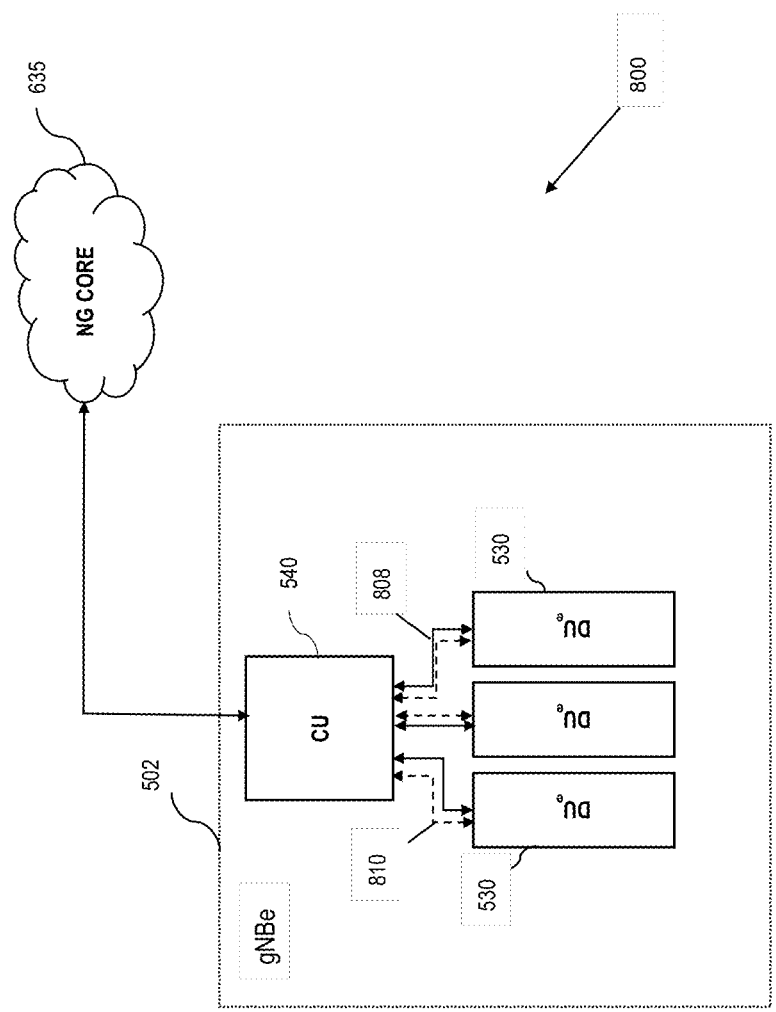
FIGS. 8A and 8B illustrates various embodiments of an enhanced gNB ($gNB_e$) CU/DU architecture according to the disclosure.
Figure 8B:
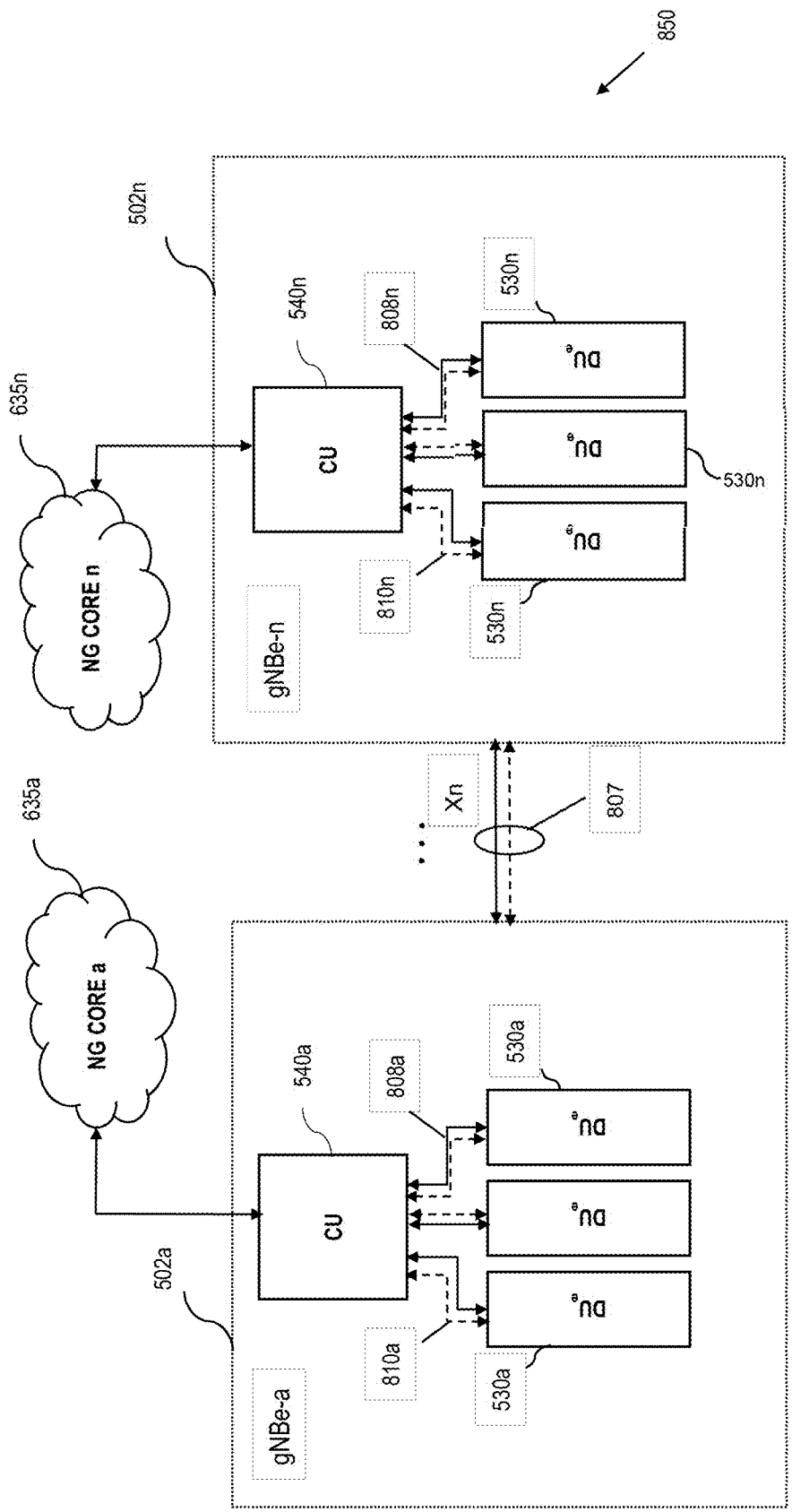

Referring now to FIGS. 8A and 8B, various embodiments of a distributed (CU/DU) gNBe architecture according to the present disclosure are described.

As shown in FIG. 8A, a first architecture 800 includes one gNBe 502 having a CU (CU) 804 and a plurality of enhanced DUs (DUe) 530. As described in greater detail subsequently herein, these enhanced entities are enabled to permit efficient UEe/Network signaling and UEe MIMO UL transmission, whether autonomously, or under control of another logical entity (such as the NG Core 635 with which the gNBe's communicate, or components thereof).

The individual DUe's 530 in FIG. 8A communicate data and messaging with the CU 804 via interposed physical communication interfaces 808 and logical interfaces 810. Such interfaces may include a user plane and control plane, and be embodied in prescribed protocols such as F1AP. It will be noted that in this embodiment, one CU 804 is associated with one or more DUe's 530, yet a given DUe is only associated with a single CU. Likewise, each single CU is communicative with a single common NG Core 635 in this embodiment, such as that operated by an MNO or MSO.

In the architecture 850 of FIG. 8B, two or more gNBe's 502a-n are communicative with one another via e.g., an Xn interface 807, and accordingly can conduct at least CU to CU data transfer and communication (including for any desired coordination of MIMO UL functions or configurations, such as for a UEe handing over from one gNBe to another). Separate NG Cores 635a-n are used for control and user plane (and other) functions of the network.

It will also be appreciated that while described primarily with respect to a unitary gNBe-CU entity or device as shown in FIGS. 8A-8B, the present disclosure is in no way limited to such architectures. For example, the techniques described herein may be implemented as part of a distributed or dis-aggregated or distributed CU entity 540 (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBes may be utilized consistent with the architectures of FIGS. 8A-8B. For instance, a given DUe 530 may act (i) solely as a DUe (i.e., 5G NR Rel. 17 MIMO-enhanced PHY node) and operate outside of an E-UTRAN macrocell, or (ii) be physically co-located with an eNB or femtocell and provide NR coverage within a portion of the eNB macrocell coverage area, or (iii) be physically non-co-located with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

The foregoing split options are intended to enable flexible hardware implementations which allow scalable cost-effective solutions, as well as coordination for e.g., performance features, load management, MIMO UL transmission and configuration, and real-time performance optimization. Moreover, configurable functional splits enable dynamic adaptation to various use cases and operational scenarios. Factors considered in determining how/when to implement such options can include for example: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It will also be appreciated that while not shown, mixtures or gNBe 502 and gNB (i.e., unenhanced gNBs), as well as DU/DUe and/or CU/CUe within those gNBe devices 502, may be used. For example, if a given DU is known to service only UE devices, or UEe devices not transmitting more than four layers in UL, such DU may not need enhancement. As another example, if all enhanced MIMO functionality described herein is contained within the CUe of a given gNBe (i.e., the MIMO UL logic is entirely within the controller of a given gNBe), enhanced DU (DUe) may be obviated. Similarly, if all MIMO enhancement logic is within one or more of the DUes, then an unenhanced CU may be used (e.g., as shown in the embodiments of FIGS. 8A and 8B).

Service Provider Network

Figure 9:
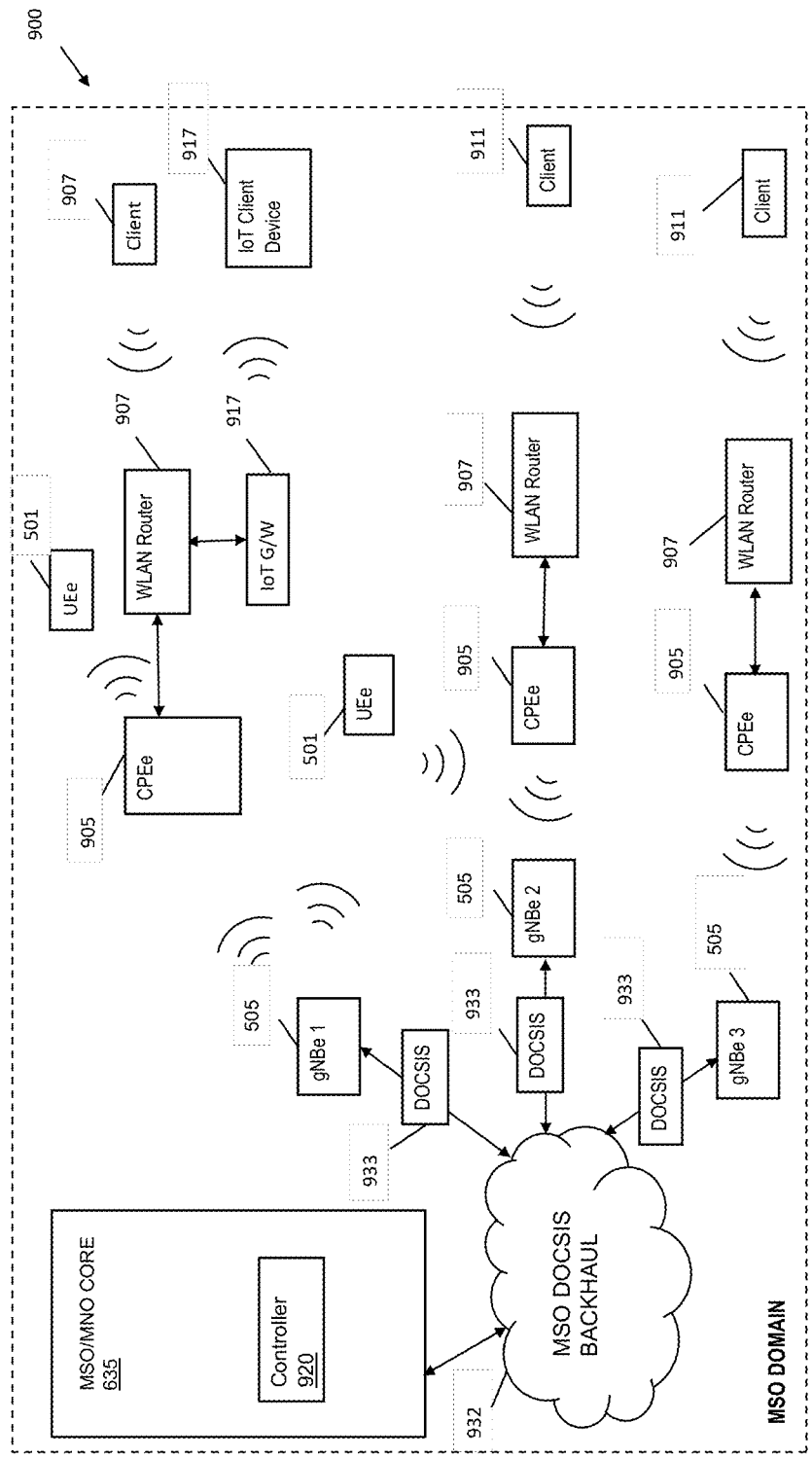
FIG. 9 is a functional block diagram of a first exemplary MSO network architecture useful in conjunction with various methods and apparatus described herein.

FIG. 9 illustrates a typical service provider network configuration useful with the features of the apparatus and methods described herein. It will be appreciated that while described with respect to such network configuration, the methods and apparatus described herein may readily be used with other network types and topologies, whether wired or wireless, managed or unmanaged.

The exemplary service provider network 900 is used in the embodiment of FIG. 9 to provide backhaul and Internet access from the service provider's wireless access nodes (e.g., eNB, gNBe or Node B NR-U) devices, Wi-Fi APs, and FWA devices operated or maintained by the MSO), and one or more stand-alone or embedded DOCSIS cable modems (CMs) 933 in data communication therewith. It will be appreciated that the gNBe and UEe devices described herein may operate on licensed, unlicensed, or quasi-licensed/shared access spectrum while utilizing the underlying 3GPP 4G/5G NR/NR-U based protocols described herein, or mixtures thereof (e.g., mmWave in 52.6-71 GHz band for unlicensed 5G NR Rel. 17 operations, NR-U bands for other 5G NR operations, and e.g., CBRS or C-Bands (e.g., 3.550-3.700 GHz) for 4G/4.5G operation). Many permutations of the foregoing (and in fact others) will be appreciated by those of ordinary skill given the present disclosure.

The individual gNBe's 502 or other NodeB devices are backhauled by the CMs 933, or alternatively optical fiber or mmWave (not shown) to the MSO core 932 via e.g., CMTS or CCAP MHAv2/RPD or other such architecture, and the MSO core 932 includes at least some of the EPC/5GC core functions previously described. While not shown, it will also be appreciated that the logic of the UEe relating to MIMO Enhancement operation may also be communicative with and controlled at least in part by a network controller 920 in some embodiments, such as via established connections between the UEe and one or more gNBe's 502.

Client devices 911 such as tablets, smartphones, SmartTVs, etc. at each premises are served by respective WLAN routers 907, IoT gateways 917, and NR-U or CBRS capable CPE/FWA 905, the latter which are backhauled to the MSO core or backbone via their respective gNBe's, and which themselves may be enhanced with MIMO UL capability to act in effect as fixed UEe. While such devices may not be mobile as in the exemplary UEe 501 previously described, they may be equipped with large antenna array and (massive) MIMO technology as previously described herein, including point-to-point mmWave operation in the 52.6-71 GHz band or other. As such, the present disclosure contemplates servicing of any number of different configurations of UEe including both mobile and fixed devices, and a number of possible RAN and PLMN configurations (including femto-cell and small-cell "micro" networks maintained by multiple different subscribers or enterprises, including those operating within or adjacent to coverage areas of MSO or MNO macrocells.

Notably, in the embodiment of FIG. 9, all of the necessary components for support of the wireless service provision and backhaul functionality are owned, maintained and/or operated by the common entity (e.g., cable MSO). The approach of FIG. 9 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DU/CU Option "splits" within the infrastructure, selection or configuration of subsets or groups of gNBe (or their individual DUe) which can participate in coordinated UEe MIMO UL configuration and utilization management, RRC connection processes, etc. For instance, where UL coverage of a given UEe is poor, it may in a coordinated fashion utilize DFT S-OFDM mode for its UL to enhance coverage, consistent with maintaining minimal impact on other nearby UEe or gNBe.

Methods

Figure 10:
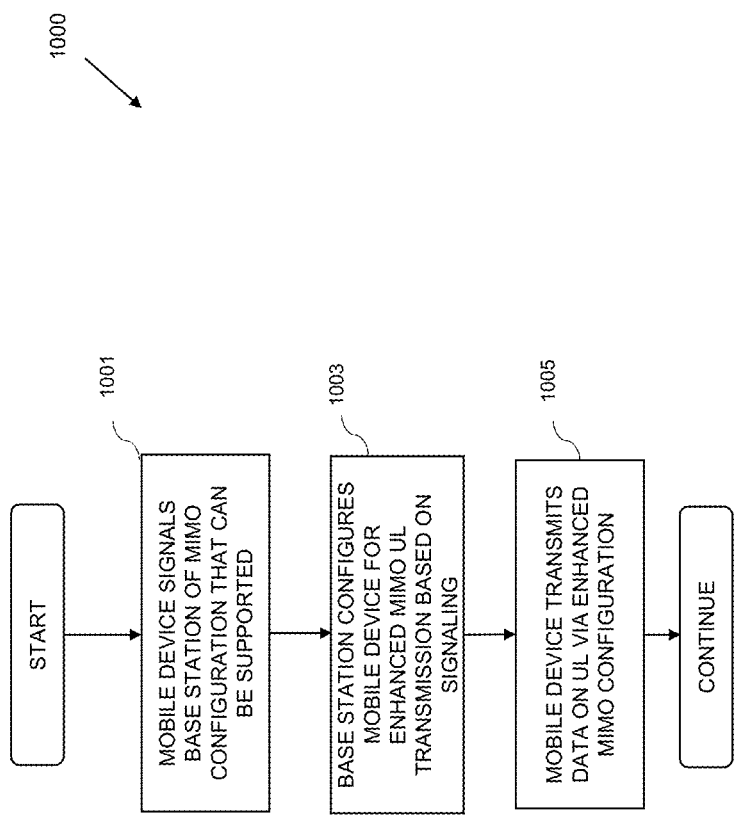
FIG. 10 is logic flow diagram illustrating a first exemplary embodiment of a generalized method for configuring a user device for enhanced MIMO UL transmission.

FIG. 10 is logic flow diagram illustrating a first exemplary embodiment of a generalized method for configuring a user device for enhanced MIMO UL transmission according to the present disclosure.

As shown, the method 1000 includes a mobile device such as a UE signaling a base station (e.g., gNB) regarding its supported MIMO configuration per step 1001. As described elsewhere herein, this may include the maximum number of layers supported, and other data pertinent to determining the mobile device's MIMO UL configuration.

Per step 1003, the base station configures the mobile device for enhanced UL MIMO transmission based on the data obtained from the mobile device, as well as other data such as relevant channel quality between the mobile device and the base station.

Lastly, per step 1005, the configured mobile device transmits data on the enhanced (e.g., higher throughput) MIMO UL to the base station.

1. Dynamically Scheduled PUSCH

Figure 11:
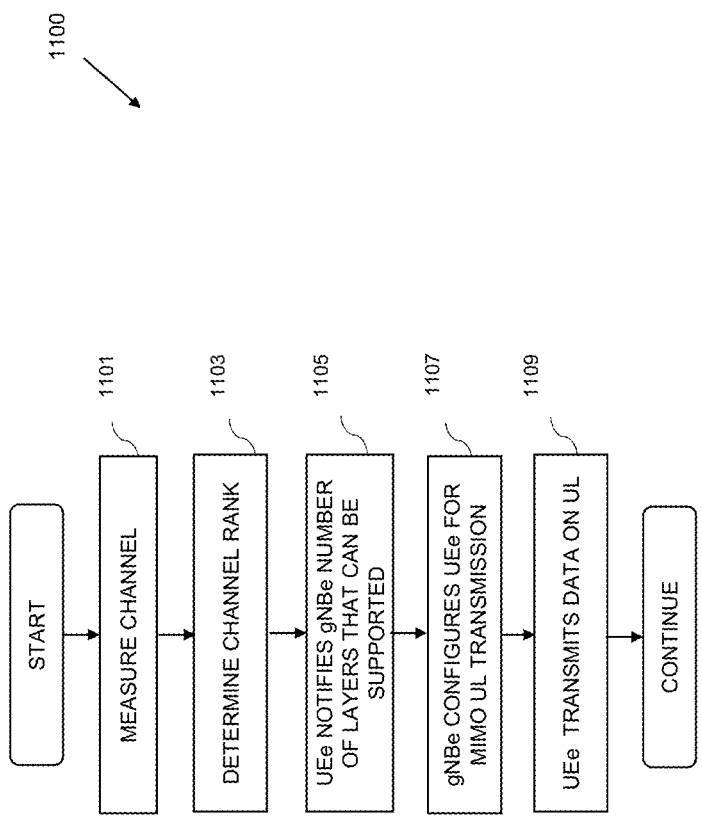
FIG. 11 is logic flow diagram illustrating a first exemplary implementation of the method of FIG. 10.

FIG. 11 is logic flow diagram illustrating a first exemplary implementation of the method of FIG. 10, wherein a dynamic scheduling approach is used within the exemplary context of the 3GPP 5G NR Release-17 architecture of FIG. 5 described previously herein.

At step 1101, the MIMO channel between the UEe 501 and the gNBe is measured, such as via the Sounding Reference Signals (SRS) generated by the UEe.

Per step 1103, once the measurement of the channel is completed, the UEe 501 determines the MIMO channel rank. The MIMO channel rank determines or describes the number of the layers that the UEe can transmit in the UL such that gNBe can decode the transmitted layers.

Per step 1105, the UEe notifies the gNBe of the number of layers it can support via Information Element (IE) PUSCH-ServingCellConfig. As described elsewhere herein, the maximum number of layers the UEe can support is configurable and based on UEe configuration (number of ports and antenna elements), and for mmWave applications may be 6, 8, 16, 32, 64, or yet other values.

Per step 1107, the gNBe configures the UEe for the MIMO transmission in UL, and notifies the UEe the number of layers and precoding matrix to be used. This selected configuration may be based not only on the UEe's specific data (which may vary between UEe's), but also on channel conditions which also may vary on a per-UEe basis. As such, the maximum number of available layers may not always be selected by the gNBe for a given UEe.

Per step 1109, the UEe applies the precoding matrix configured by the gNBe to the selected number of data layers, and transmits the data in the UL using that configuration.

It will be recognized that the methods described in FIG. 11 is for the condition where the PUSCH is dynamically scheduled via DCI format 0_1 on the PDCCH. As described previously, in dynamically scheduled PUSCH, the UEe receives a dynamic uplink grant in DCI format 0_1, and obtains the frequency and time domain resources of the corresponding PUSCH. As such, the method of FIG. 11 is applicable to both CP-OFDM and DFT-S-OFDM modulations schemes specified in the 5G specifications.

Figure 11A:
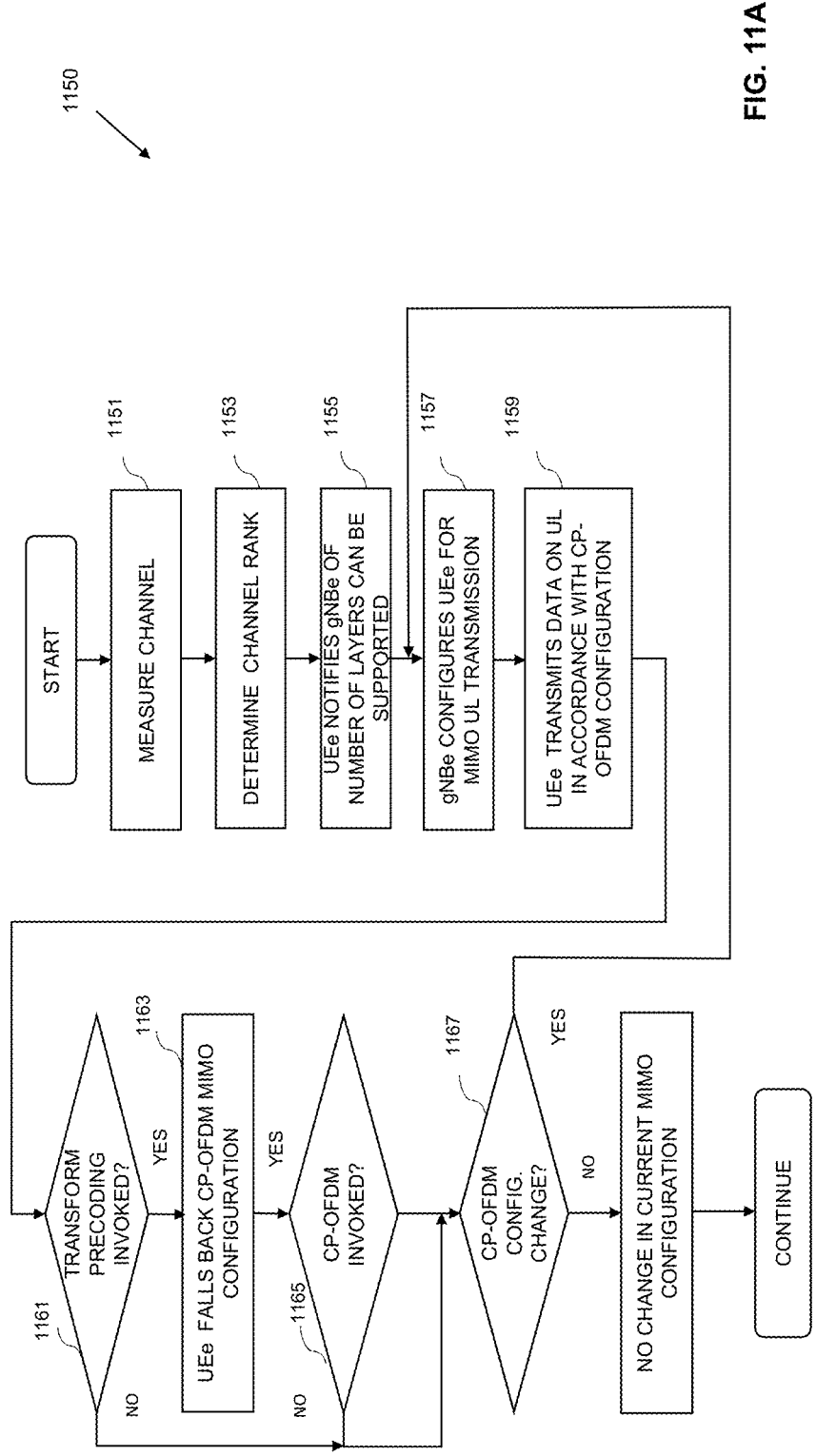
FIG. 11A is logic flow diagram illustrating a second exemplary implementation of the method of FIG. 10, wherein transitions to/from transform precode mode operation are used.

FIG. 11A is logic flow diagram illustrating a second exemplary implementation of the method of FIG. 10, wherein transitions to/from transform precode mode operation are used.

At step 1151 of the method 1150, the MIMO channel between the UEe 501 and the gNBe is measured, such as via the Sounding Reference Signals (SRS).

Per step 1153, once the measurement of the channel is completed, the UEe 501 determines the MIMO channel rank. The MIMO channel rank determines or describes the number of the layers that the UEe can transmit in the UL such that gNBe can decode the transmitted layers.

Per step 1155, the UEe notifies the gNBe of the number of layers it can support via Information Element (IE) PUSCH-ServingCellConfig.

Per step 1157, the gNBe configures the UEe for the MIMO transmission in UL, and notifies the UEe the number of layers and precoding matrix to be used.

Per step 1159, the UEe applies the precoding matrix configured by the gNBe to the selected number of data layers, and transmits the data in the UL using that configuration.

Per step 1161, the UEe determines if the gNBe 502 has invoked transform precoding (e.g., DFT-S-OFDM) mode operation. If the gNBe has invoked the transform precoding mode, the UEe proceeds to step 1163 to "fall back" to its previous MIMO configuration state (i.e., that associated with or specified for CP-OFDM mode operation), and transmit data using the numbers of layers and precoding matrix it was configured for before entering transform precode mode. In this fashion, the UEe does not have to use the more restricted single-layer maximum specified with earlier Releases of the NR standard for transform precode operation, but rather can fall back to the enhanced capabilities of CP-OFDM which it was previously using, while still maintaining the other desirable attributes of DFT-S-OFDM such as enhanced UL coverage area.

Subsequently, per step 1165, if CP-OFDM is again invoked (or transform precode "cancelled") by the gNBe, the UEe 501 then can simply maintain its current transform-precode mode configuration, which is identical to the prevailing configuration, unless per step 1167 the gNBe has signaled a new configuration for CP-OFDM.

Figure 12:
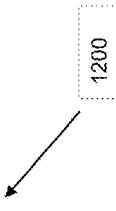
FIG. 12 is a graphical representation of exemplary embodiment of enhanced PUSCH-ServingCellConfig IE including enhanced maxMIMO-Layers specification.

FIG. 12 is a graphical representation of exemplary embodiment of enhanced PUSCH-ServingCellConfig information element 1200 according to the present disclosure. As shown, the parameters 1200 include an expanded maxMIMO-Layers field 1203, which here is shown as being an integer from 1-8, although other values and ranges may be used.

FIG. 13A is a graphical representation of exemplary prior art 3GPP MIMO-Layers parameter IE. FIG. 13B, in contrast, is a graphical representation of exemplary embodiment of an enhanced 3GPP IE MIMO-Layers parameters IE according to the disclosure, illustrating the MIMO-LayersUL-r17 field 1350 with exemplary expansion up to eight (8) layers.

FIG. 14A is a graphical representation of exemplary prior art 3GPP PUSCH-Config parameter IE with maxRank field limited to 4 layers 1430. In contrast, FIG. 14B is a graphical representation of exemplary embodiment of an enhanced PUSCH-Config parameter IE according to the disclosure, including the maxRank field 1460 expanded up to an exemplary value of 8 layers.

Figure 15:
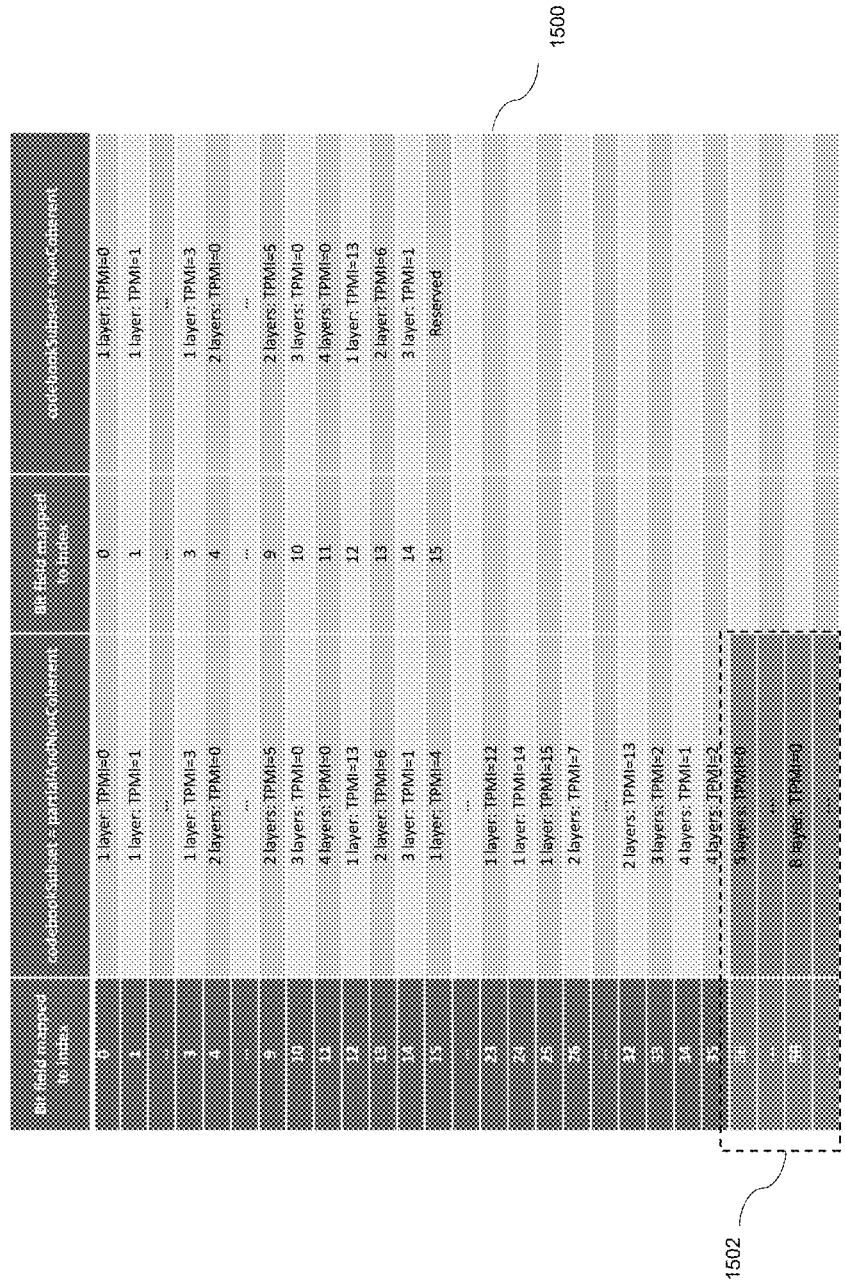
FIG. 15 is a table representing one embodiment of enhanced precoding and layer information according to the disclosure.

FIG. 15 shows a table 1500 representing one embodiment of enhanced precoding and layer information according to the disclosure.

In one variant, an existing number of bits in the structure (e.g., 6) is utilized to encode a plurality of different precode matrix and layer number combinations, including layer numbers above 4 for UL CP-OFDM mode operation. In another variant, additional bits are added to enable encoding of a larger number of precode matrix/layer number combinations, such as for very large mmWave MIMO arrays (e.g., 8-bits, 10-bits, etc.).

In one implementation (as shown in FIG. 15), several of the existing reserved values 1502 in the existing precoding information and layer Tables in TS 38.212 Sec. 7.3.1.1.2 for maxRank greater than 2 can be utilized for indication of n-layer (n>1 or 4, depending on mode) parameters.

Figure 16:
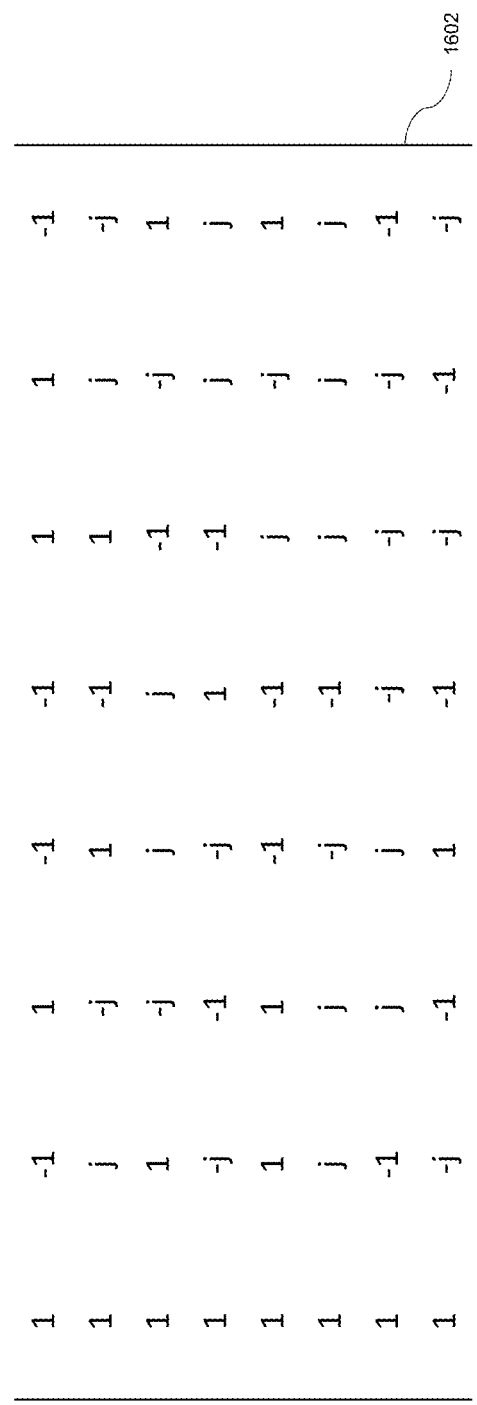
FIG. 16 is a graphical representation of one embodiment of a multi-layer (here, 8 layer) UL MIMO codebook according to the disclosure.

FIG. 16 is a graphical representation of one embodiment of a multi-layer (here, 8 layer) UL MIMO codebook according to the disclosure. In the case of codebook-based PUSCH precoding, an example of an 8-layer UL MIMO codebook 1602 applied over 8 antenna ports is shown. A key principle of this embodiment is for the precoding matrix to be of full rank. The entries of the precoding matrix may be derived from row and/or column permutations of the example herein. For example, for 8-layer transmission, the precoding matrix needs to be of rank 8, i.e., 8 linearly independent columns.

In certain embodiments, the DMRS port information indicated in DCI format 0_1 needs to be updated to indicate the increased number of layers. FIG. 17A illustrates a prior art DMRS port specification 1700 for dmrs-Type=1, DMRS-maxLength=1, rank=4, as specified in Table 7.3.1.1.2-11 TS 38.214.

In contrast, FIG. 17B is a graphical representation of exemplary embodiment of an enhanced DMRS specification 1730 according to the present disclosure, wherein an expanded number of layers/ports is used, and multiple options are available to the selecting process (e.g., gNBe or UEe). As shown, the configuration 1730 of FIG. 17B provides not only the extant four-port option, but also higher numbers of ports, such as 6, 8, 16, and 32 based on the value selected.

Figure 18A:
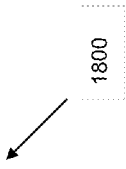
FIG. 18A is a graphical representation of exemplary embodiment of a prior art SRS information element.
Figure 18B:
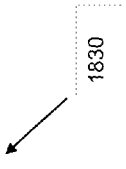
FIG. 18B is a graphical representation of exemplary embodiment of an enhanced SRS information element according to the disclosure.

In addition, the number of Sounding Reference Signal (SRS) antenna ports is required to be increased to at least 8. As a brief aside, the gNBe measures the SRS signals in the UL to estimate the UL MIMO channel, and decode the UL data from the UEe. In order to decode n independent layers, n SRS signals/ports are required. Accordingly, the number of supported SRS ports may also be increased from the current limited value of four ports (FIG. 18A) to a higher value (e.g., eight) in the SRS-Config IE, as shown in FIG. 18B.

2. CG-PUSCH

Figure 19:
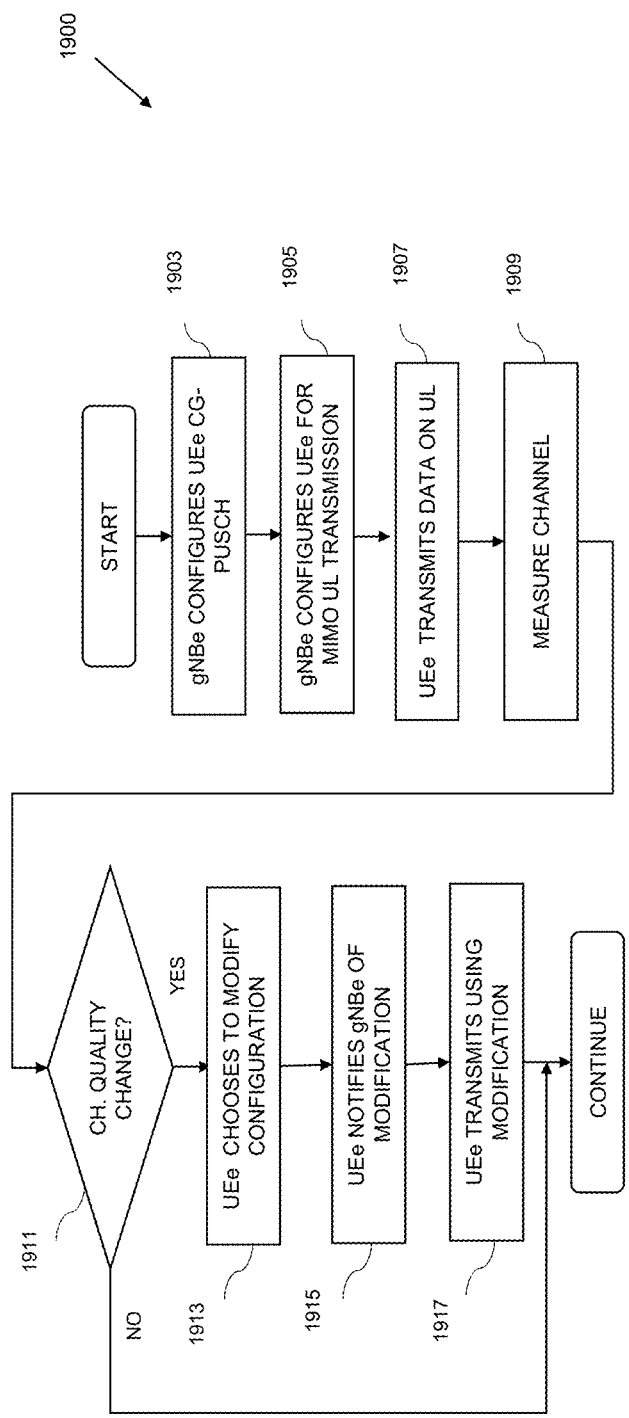
FIG. 19 is logic flow diagram illustrating an exemplary embodiment of a method for configuring a UEe for CG-PUSCH UL transmission.

FIG. 19 is logic flow diagram illustrating an exemplary embodiment of a method for configuring a UEe for CG-PUSCH UL transmission. Unlike the dynamically scheduled UL channel described above with respect to FIGS. 11-11A, the CG (configured grant) scheduling is predetermined.

At step 1903 of the method 1900, the gNBe 502 configures the UEe 501 CG-PUSCH transmission. The UEe may be configured with either with TYPE 1 CG-PUSCH or TYPE 2 CG-PUSCH, as specified in 3GPP TS 38.214.

In TYPE I CG-PUSCH transmissions, RRC signaling configures the time domain resource allocation. In TYPE 2 CG-PUSCH transmission, only periodicity and number of repetitions are configured by RRC signaling, while the other parameters are configured through a DCI.

Per step 1905, the gNBe configures the UEe with spatial multiplexing MIMO transmission in the UL, including the number of spatial layers to be used.

Per step 1907, the UEe transmits data on CG-PUSCH to the gNBe using the configured number of spatial layers from step 1905.

Per step 1909, the channel quality is measured (such as via sounding reference signals (SRS) signals transmitted from to gNB from the UEe, or from demodulation reference (DMRS) signals).

Per step 1911, it is determined if the channel quality has changed, such as by the UEe (or the gNBe). If quality has changed, the method proceeds to step 1913, wherein the UEe chooses to modify the current configuration based on the detected changes.

Per step 1915, the UEe notifies the gNBe that it is transmitting data using the changed configuration, such as via Uplink Control Information (UCI).

Finally, the UEe transmits data to the gNBe via the changed CG-PUSCH configuration at step 1507.

Figure 19A:
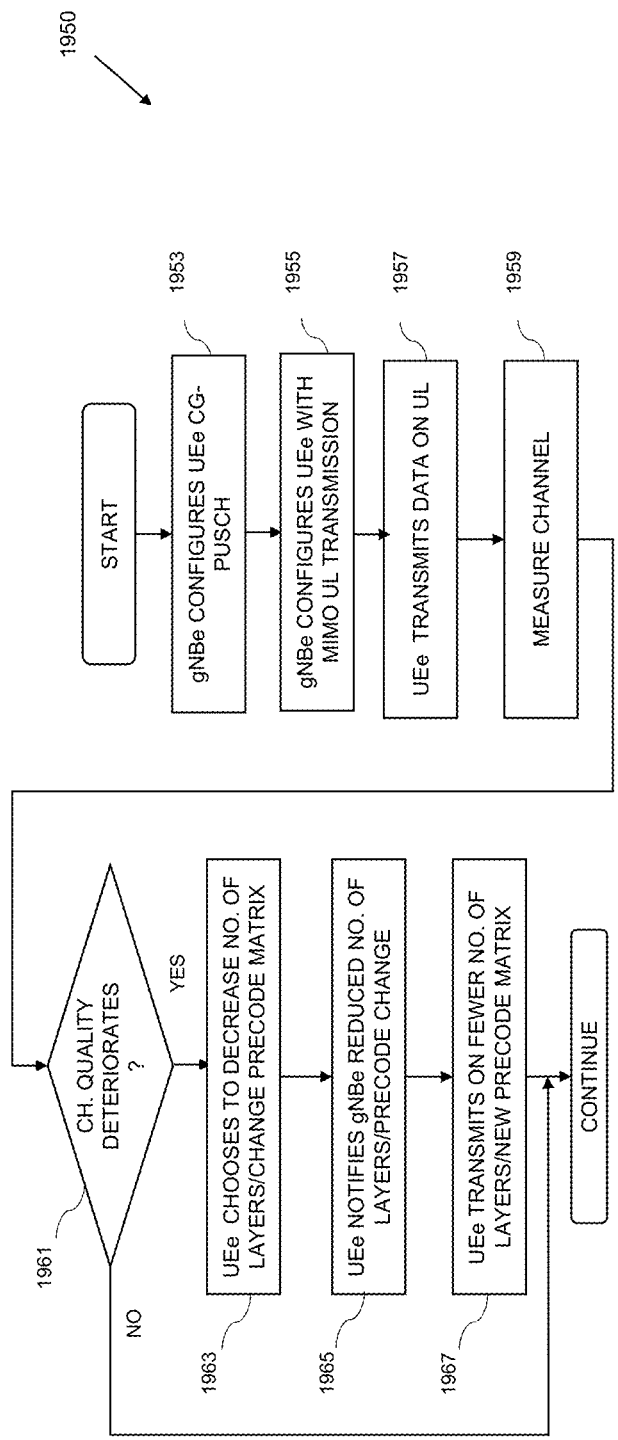
FIG. 19A is logic flow diagram illustrating an exemplary implementation of the method of FIG. 19.

FIG. 19A is logic flow diagram illustrating an exemplary implementation of the generalized method of FIG. 19. At step 1953, the gNBe configures the UEe for CG-PUSCH transmission as described above.

Per step 1955, the gNBe configures the UEe for spatial multiplexing MIMO transmission in the UL, including the number of spatial layers to be used.

Per step 1957, the UEe transmits data on CG-PUSCH to the gNBe using the configured number of spatial layers.

Per step 1959, the channel quality between the UEe and the gNBe is assessed, and per step 1961, the determination is made that the channel quality has deteriorated. When deteriorated, the method proceeds to step 1963, wherein either or both of (i) th number of MIMO transmission layers, and/or (ii) the precoding matrix, is/are changed in order to compensate for the changed channel conditions (in this instance, it will be noted that that since channel quality degraded, the channel can sustain fewer layers and less capable precode, but the channel may have also increased in quality, wherein more layers/more capable precode can be used.

Per step 1965, the UEe notifies the gNBe that it is transmitting data on the reduced number of layers and/or using changed precode matrix via Uplink Control Information (UCI).

Finally, the UEe transmits data to the gNBe on e.g., the fewer number of layers than was used for transmitting at step 1957.

It will be noted that while the methods illustrated in FIGS. 19-19A are described for the situation where the UE is configured with CG-PUSCH for the transmission of uplink data, the illustrated methods may be readily adapted to both CP-OFDM and DFT-S-OFDM modulations schemes specified in the 5G specifications.

As a brief aside, in Release-16 NR-Unlicensed (NR-U), CG uplink control information (UCI) is transmitted together with each CG PUSCH transmission (e.g., prepended thereto). In order to assist PUSCH decoding at the gNB, this Release-16 CG-UCI contains: (i) HARQ ID (4 bits); (ii) New Data Indicator or NDI (1 bit); (iii) Redundancy Version or RV (2 bits); and (iv) Channel occupancy sharing information. FIG. 20A illustrates such prior art CG-Uplink Control Information (UCI) CG-UCI, as specified in Table 6.3.2.1-3 in TS 38.212.

By contrast, FIG. 20B illustrates an example of an example for an enhanced CG-UCI 1630 according to the present disclosure, wherein an additional field 1633 indicating precoding and the number of layers is included in addition to those data fields described above. This added field enables the UEe to signal to the gNBe of changes to the actual precoding matrix and/or number of layers necessitated by e.g., changing channel physical conditions. In the illustrated embodiment, encoding similar to that previously discussed (i.e., (0-63) can be utilized). For instance, referring again to the Table 1500 of FIG. 15, an existing number of bits in the structure (e.g., 6 bits to encode $2^6$ or 64 different values) is utilized to encode a plurality of different precode matrix and layer number combinations, including layer numbers above 4 for UL CP-OFDM mode operation. In another variant, additional bits are added to enable encoding of a larger number of precode matrix/layer number combinations, such as for very large mmWave MIMO arrays (e.g., 8-bits for $2^8$ or 256 values, 10-bits for 1024 values, etc.).

FIG. 20C illustrates another example of an enhanced CG-UCI, wherein additional fields 2053, 2055 indicating precoding and number of layers, and codewords, respectively, are included. For example, in some cases, when the UEe uses multiple codewords in its UL transmission, the CG-UCI may also include field 2055 to inform the gNBe of the codewords it is using for UL transmission on the CG PUSCH. In one variant, this data is encoded using a 1-bit field 'number of codewords' or the like.

In addition, separate HARQ ID, NDI, RV fields may be utilized on a per-codeword basis as shown in FIG. 20C (i.e., {HARQ ID A, HARQ ID B}, {NDI A, NDI B}, {RV A, RV B} for codeword A and codeword B). In one implementation, if the 1-bit 'number of codewords' field 2055 indicates only 1 codeword is being transmitted, then the gNB will only read the first half of the bits in the {HARQ ID A, HARQ ID B}, {NDI A, NDI B}, and {RV A, RV B} fields, and ignore the remaining bits. However, when two codewords are signaled, then both fields (e.g., HARQ A and HARQ B) are read.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of operating a millimeter wave (mmWave)-enabled wireless user device, within a wireless network comprising at least one wireless access node, the method comprising:

receiving, from the at least one wireless access node and via an array of multiple antenna elements of the mmWave-enabled wireless user device, data relating to configuration of (i) the mmWave-enabled wireless user device for a maximum number of data layers supported for transmission of data in an UL (uplink) wireless channel, and (ii) one or more transmission protocols for the transmission of the data in the UL wireless channel;

configuring the mmWave-enabled wireless user device according to the received data, the configuring comprising configuring the mm Wave-enabled wireless user device to a transform precode configuration, which utilizes at least two of a plurality of spatial multiplexing layers;

transmitting data on the UL wireless channel using the at least two of the plurality of spatial multiplexing layers in the transform precode configuration and the one or more transmission protocols from the mmWave-enabled wireless user device to the at least one wireless access node;

determining that the at least one wireless access node has invoked the transform precode configuration; and based on the determining, modifying the configuration of the mmWave-enabled wireless user device to a non-transform precode configuration, wherein the mmWave-enabled wireless user device is enabled to maintain utilization of the at least two of the plurality of spatial multiplexing layers while in the non-transform precode configuration.

2. The method of claim 1, further comprising providing the at least one wireless access node with data relating to the maximum number of data layers comprises providing the data on an uplink shared channel established between the mmWave-enabled wireless user device and the at least one wireless access node.

3. The method of claim 2, wherein:
the transmitting of the data on the UL wireless channel using the at least two of the plurality of spatial multiplexing layers and the one or more transmission protocols comprises utilizing a precoding matrix configured by the at least one wireless access node for a configured number of data layers for the transmitting of the data on the UL wireless channel.

4. The method of claim 3, wherein:
the at least one wireless access node comprises a 3GPP (Third Generation Partnership Project) 5G NR (Fifth Generation New Radio) compliant gNodeB comprising at least one CU (controller unit) and at least one DU (distributed unit);
the mmWave-enabled wireless user device comprises a 3GPP compliant UE (user equipment) having a plurality of ports associated with the array of antenna elements; and
the providing the at least one wireless access node the data relating to the maximum number of data layers supported comprises transmitting at least one information element comprising data relating to the maximum number of data layers supported on a PUSCH (Physical Uplink Shared Channel).

5. The method of claim 1, wherein the receiving and transmitting occur with a frequency range comprising 52.6 GHz-71 GHz, the array of multiple antenna elements comprises an array of 16 or greater antenna elements, and the mmWave-enabled wireless user device further comprises at least one wireless interface comprising 16 or greater antenna ports associated with the 16 or greater antenna elements, respectively.

6. The method of claim 1, wherein the mmWave-enabled wireless user device comprises a 3GPP compliant UE (user equipment), the array of multiple antennas having a plurality of antenna elements, and the maximum number of data layers comprises a number greater than four (4) data layers.

7. The method of claim 1, wherein:
the mmWave-enabled wireless user device comprises a 3GPP compliant handheld mobile device; and
the operating comprises operating the 3GPP compliant handheld mobile device in either a cyclic prefix (CP) or discrete Fourier Transform (DFT) mode.

8. The method of claim 1, wherein:
the mmWave-enabled wireless user device comprises a fixed wireless access (FWA) mmWave-enabled wireless user device;
the at least one wireless access node comprises at least one small-cell wireless access node operated by a multiple systems operator (MSO) and backhauled by hybrid fiber coax (HFC) network of the MSO; and
the receiving, from the at least one wireless access node and via the array of the multiple antenna elements of the mmWave-enabled wireless user device, the data relating to the configuration comprises receiving via an array of multiple antenna elements associated with the FWA mmWave-enabled wireless user device from the at least one small-cell wireless access node, the data relating to configuration, the receiving occurring over an unlicensed mmWave frequency band utilized by the at least one small-cell wireless access node.

9. A user device configured to operate within a MIMO (multiple input multiple output) transmission architecture using a plurality of spatial layers, the user device comprising:
processor apparatus;
at least one wireless interface in data communication with the processor apparatus; and
a storage device in data communication with the processor apparatus and comprising a storage medium configured to store at least one computer program, the at least one computer program configured to, when executed on the processor apparatus, cause the user device to:
receive, from at least one wireless access node, data relating to configuration of (i) the user device for a maximum number of data layers supported for transmission of data in an UL (uplink) wireless channel, and (ii) one or more transmission protocols for the transmission of the data in the UL (uplink) wireless channel;
configure the user device according to the received data, the configuration comprising a configuration of the user device to a transform precode configuration, which utilizes at least two of a plurality of spatial multiplexing layers;
transmit data on the UL wireless channel using the at least two of the plurality of spatial multiplexing layers in the transform precode configuration and the one or more transmission protocols from the user device to the at least one wireless access node;
determine that the at least one wireless access node has invoked the transform precode configuration; and
based on the determination, modify the configuration of the user device to a non-transform precode configuration, wherein the user device is enabled to maintain utilization of the at least two of the plurality of spatial multiplexing layers while in the non-transform precode configuration.

10. The user device of claim 9, wherein the at least one computer program is further configured to, when executed on the processor apparatus, cause the user device to:
provide the at least one wireless access node with data relating to the maximum number of data layers comprises providing the data on an uplink shared channel established between the user device and the at least one wireless access node.

11. The user device of claim 10, wherein:
the transmission of the data on the UL wireless channel using the at least two of the plurality of spatial multiplexing layers and the one or more transmission protocols comprises use of a precoding matrix configured by the at least one wireless access node for a configured number of data layers for the transmitting data on the UL wireless channel.

12. The user device of claim 11, wherein:
the at least one wireless access node comprises a 3GPP (Third Generation Partnership Project) 5G NR (Fifth Generation New Radio) compliant gNodeB comprising at least one CU (controller unit) and at least one DU (distributed unit);
the user device comprises a 3GPP compliant UE (user equipment) having a plurality of ports associated with an array of antenna elements; and
the receipt of the data relating to the maximum number of data layers supported comprises receipt of at least one information element comprising data relating to the maximum number of data layers supported on a PUSCH (Physical Uplink Shared Channel).

13. The user device of claim 9, wherein:
the receipt and the transmission occur with a frequency range comprising 52.6 GHz-71 GHz;

the receipt, from the at least one wireless access node, of the data relating to the configuration comprises receipt via an array of multiple antenna elements, the array of multiple antenna elements comprising array of 16 or greater antenna elements; and the at least one wireless interface comprises 16 or greater antenna ports associated with the 16 or greater antenna elements, respectively.

14. The user device of claim 9, wherein:
the user device comprises a 3GPP compliant UE (user equipment); and
the maximum number of data layers comprises a number greater than four (4) data layers.

15. The user device of claim 9, wherein:
the user device comprises a 3GPP compliant handheld mobile device; and
the operation comprises an operation of the 3GPP compliant handheld mobile device in either a cyclic prefix (CP) or discrete Fourier Transform (DFT) mode.

16. The user device of claim 9, wherein:
the user device comprises a fixed wireless access (FWA) mmWave-enabled wireless user device having an array of multiple antenna elements;
the at least one wireless access node comprises at least one small-cell wireless access node operated by a multiple systems operator (MSO) and backhauled by hybrid fiber coax (HFC) network of the MSO; and
the receipt of the data relating to the configuration comprises receipt, via the array of multiple antenna elements from the at least one small-cell wireless access node, of the data relating to the configuration, the receipt occurring over an unlicensed mmWave frequency band utilized by the at least one small-cell wireless access node.

17. Computer readable apparatus comprising a non-transitory storage medium, the non-transitory storage medium comprising at least one computer program having a plurality of instructions, the plurality of instructions configured to, when executed on a digital processing apparatus, cause a user device configured to operate within a MIMO (multiple input multiple output) transmission architecture using a plurality of spatial layers to:
receive, from at least one wireless access node, data relating to configuration of (i) the user device for a maximum number of data layers supported for transmission of data in an UL (uplink) wireless channel, and (ii) one or more transmission protocols for the transmission of the data;
configure the user device according to the received data, the configuration comprising a configuration of the user device to a transform precode configuration, which utilizes at least two of a plurality of spatial multiplexing layers;
transmit data on the UL wireless channel using the at least two of the plurality of spatial multiplexing layers in the transform precode configuration and the one or more transmission protocols from the user device to the at least one wireless access node;
determine that the at least one wireless access node has invoked the transform precode configuration; and
based on the determination, modify the configuration of the user device to a non-transform precode configuration, wherein the user device is enabled to maintain utilization of the at least two of the plurality of spatial multiplexing layers while in the non-transform precode configuration.

18. The computer readable apparatus of claim 17, wherein the plurality of instructions are further configured to, when executed on the digital processing apparatus, cause the user device to:
provide the at least one wireless access node with data relating to the maximum number of data layers comprises providing the data on an uplink shared channel established between the user device and the at least one wireless access node.

19. The computer readable apparatus of claim 18, wherein:
the transmission of the data on the UL wireless channel using the at least two of the plurality of spatial multiplexing layers and the one or more transmission protocols comprises use of a precoding matrix configured by the at least one wireless access node for a configured number of data layers for the transmitting of the data on the UL wireless channel.

20. The computer readable apparatus of claim 19, wherein:
the at least one wireless access node comprises a 3GPP (Third Generation Partnership Project) 5G NR (Fifth Generation New Radio) compliant gNodeB comprising at least one CU (controller unit) and at least one DU (distributed unit);
the user device comprises a 3GPP compliant UE (user equipment) having a plurality of ports associated with an array of antenna elements; and
the receipt of the data relating to the maximum number of data layers supported comprises receipt of at least one information element comprising data relating to the maximum number of data layers supported on a PUSCH (Physical Uplink Shared Channel).

* * * * *